United States Patent
Tran et al.

(10) Patent No.: US 11,571,050 B2
(45) Date of Patent: Feb. 7, 2023

(54) WALLET

(71) Applicants: Thuan Tran, Santa Clara, CA (US); Charlie Carroll, Palo Alto, CA (US); Binh Tran, Santa Clara, CA (US)

(72) Inventors: Thuan Tran, Santa Clara, CA (US); Charlie Carroll, Palo Alto, CA (US); Binh Tran, Santa Clara, CA (US)

(73) Assignee: Dango Products, LLC, Portola Valley, CA (US)

( * ) Notice: Subject to any disclaimer, the term of this patent is extended or adjusted under 35 U.S.C. 154(b) by 660 days.

(21) Appl. No.: 16/659,627

(22) Filed: Oct. 22, 2019

(65) Prior Publication Data

US 2021/0112935 A1 Apr. 22, 2021

(51) Int. Cl.
| | |
|---|---|
| A45C 1/06 | (2006.01) |
| B60R 22/32 | (2006.01) |
| B25B 13/48 | (2006.01) |
| B25D 3/00 | (2006.01) |
| B25B 15/00 | (2006.01) |
| B25C 11/00 | (2006.01) |

(52) U.S. Cl.
CPC .......... *A45C 1/06* (2013.01); *A45C 2001/065* (2013.01); *A45C 2001/067* (2013.01); *B25B 13/48* (2013.01); *B25B 15/005* (2013.01); *B25B 15/007* (2013.01); *B25B 15/008* (2013.01); *B25C 11/00* (2013.01); *B25D 3/00* (2013.01); *B60R 22/32* (2013.01); *B60R 2022/328* (2013.01)

(58) Field of Classification Search
CPC ........ A45C 2001/067; A45C 2001/065; A45C 1/06
See application file for complete search history.

(56) References Cited

U.S. PATENT DOCUMENTS

| | | | | |
|---|---|---|---|---|
| 1,415,276 | A | * 5/1922 | Terner | G07B 3/04 |
| | | | | 220/DIG. 26 |
| 3,461,469 | A | 8/1969 | Morrision | |
| D256,852 | S | * 9/1980 | McGahee | D3/247 |
| 4,305,497 | A | * 12/1981 | Pacilio | A45C 11/24 |
| | | | | 206/0.81 |
| D266,479 | S | 10/1982 | Hayakawa | |

(Continued)

FOREIGN PATENT DOCUMENTS

KR 20140003803 U 6/2014

OTHER PUBLICATIONS

Dango Products—Wallet Collections—Available from Internet <URL: www.dangoproducts.com/collections/wallets>—Available at least as of Oct. 19, 2017—Retrieved from Internet Archive Wayback Machine <URL: https://web.archive.org/web/20171019082039/www.dangoproducts.com/collections/wallets> on Oct. 23, 2020.

(Continued)

*Primary Examiner* — Jennifer Robertson
*Assistant Examiner* — Justin Caudill
(74) *Attorney, Agent, or Firm* — Gallium Law; Wesley Schwie, Esq.; Isabel Fox

(57) ABSTRACT

A wallet includes a first shell with one or more openings on a shell perimeter adapted to clip one or more objects to the one or more openings; and a second shell coupled to the first shell, the second shell including a storage compartment; and first and second rails on each side of the second metal shell to slideably receive one or more cards in the storage compartment.

16 Claims, 23 Drawing Sheets

(56) References Cited

U.S. PATENT DOCUMENTS

| Patent/Pub No. | Date | Name | Class |
|---|---|---|---|
| 4,691,456 A * | 9/1987 | Ackeret | B42F 7/14 40/721 |
| 4,763,821 A | 8/1988 | Powell | |
| 4,774,779 A * | 10/1988 | Ackeret | B42F 7/14 40/511 |
| D314,865 S | 2/1991 | Tuisku | |
| 5,038,926 A * | 8/1991 | van der Toorn | B42F 7/00 150/147 |
| D322,039 S | 12/1991 | Chien | |
| 5,234,351 A * | 8/1993 | Dixon | H05K 5/0265 439/152 |
| D360,815 S | 8/1995 | Padden | |
| D374,388 S | 10/1996 | Padden | |
| 5,573,164 A * | 11/1996 | Law | B60R 7/06 224/571 |
| 5,592,767 A * | 1/1997 | Treske | G09F 3/207 24/3.12 |
| D384,499 S | 10/1997 | Gaestel | |
| 5,740,624 A * | 4/1998 | Baseley | A45C 11/182 40/27.5 |
| 5,901,764 A * | 5/1999 | Ritter | A45C 11/182 206/39.6 |
| 5,929,427 A * | 7/1999 | Harada | G06K 7/006 235/492 |
| 5,944,080 A | 8/1999 | Podwika | |
| D416,581 S | 11/1999 | Cheng | |
| 6,009,584 A | 1/2000 | Padden | |
| 6,044,967 A | 4/2000 | Painsith | |
| 6,076,665 A | 6/2000 | Chuang | |
| 6,089,289 A * | 7/2000 | Florjancic | A45C 11/182 206/39.6 |
| D431,105 S | 9/2000 | Ling | |
| 6,145,994 A | 11/2000 | Ng | |
| D434,624 S | 12/2000 | Padden | |
| 6,276,414 B1 | 5/2001 | Bibb | |
| D444,060 S | 6/2001 | Elsener | |
| 6,347,875 B1 | 2/2002 | Painsith | |
| D462,000 S | 8/2002 | Hightower | |
| 6,427,837 B1 | 8/2002 | Shields | |
| 6,460,698 B1 | 10/2002 | Wang | |
| 6,823,910 B1 | 11/2004 | Elnekaveh | |
| D517,390 S | 3/2006 | Cheng | |
| 7,334,616 B2 | 2/2008 | Kaminski | |
| 7,604,028 B2 | 10/2009 | Bridgefarmer | |
| 7,617,928 B1 * | 11/2009 | Murphy | B65D 83/12 206/39 |
| 7,918,335 B1 | 4/2011 | Kitchen | |
| 8,047,363 B2 * | 11/2011 | Sheba | A45C 11/18 206/307 |
| 8,251,210 B2 | 8/2012 | Schmidt | |
| D685,990 S | 7/2013 | Zhang | |
| D690,931 S | 10/2013 | Minn | |
| 8,567,459 B2 | 10/2013 | Kitchen | |
| D695,013 S | 12/2013 | Minn | |
| D701,043 S | 3/2014 | Minn | |
| 8,726,952 B2 | 5/2014 | Jambunathan | |
| D707,091 S | 6/2014 | Barr | |
| 8,899,411 B2 * | 12/2014 | Van Geer | A45C 11/182 206/39.4 |
| 9,125,464 B2 | 9/2015 | Minn | |
| 9,125,465 B2 | 9/2015 | Beckley | |
| D743,760 S | 11/2015 | Barr | |
| D751,877 S | 3/2016 | Shlaferman | |
| D755,764 S | 5/2016 | Dong | |
| 9,339,094 B2 | 5/2016 | Tucker-Skow | |
| D765,487 S | 9/2016 | Barr | |
| D768,383 S | 10/2016 | Wu | |
| D772,678 S | 11/2016 | Haarburger | |
| D775,824 S | 1/2017 | King | |
| D780,449 S | 3/2017 | King | |
| 9,615,641 B2 * | 4/2017 | Yeung | A45C 13/007 |
| 9,648,931 B2 | 5/2017 | Sha | |
| 9,661,908 B2 | 5/2017 | Mayer | |
| D792,749 S | 7/2017 | Faro | |
| D798,591 S | 10/2017 | King | |
| D799,301 S | 10/2017 | Cetera | |
| 9,775,328 B1 | 10/2017 | Fidrych | |
| 9,815,212 B2 | 11/2017 | Barr | |
| D805,873 S | 12/2017 | Cetera | |
| D806,386 S | 1/2018 | King | |
| D808,765 S * | 1/2018 | Kisling | D8/19 |
| 9,907,375 B1 | 3/2018 | Kitchen | |
| D814,182 S | 4/2018 | Haarburger | |
| D814,183 S | 4/2018 | Haarburger | |
| D815,932 S | 4/2018 | Lee | |
| D815,935 S | 4/2018 | Barak | |
| D817,196 S | 5/2018 | Haarburger | |
| D817,316 S | 5/2018 | Srour | |
| D827,408 S | 9/2018 | Stefanczyk-Lacor | |
| 10,080,409 B2 | 9/2018 | King | |
| D831,349 S | 10/2018 | Deng | |
| 10,123,596 B2 | 11/2018 | King | |
| D835,410 S | 12/2018 | Chan | |
| 10,201,216 B2 * | 2/2019 | Van Geer | A45C 11/182 |
| 10,206,473 B2 | 2/2019 | Haarburger | |
| D842,070 S | 3/2019 | Kisling | |
| D845,623 S | 4/2019 | Sullivan | |
| D856,956 S | 8/2019 | Liu | |
| 10,368,618 B2 | 8/2019 | Richards | |
| D860,645 S | 9/2019 | Wu | |
| D866,177 S | 11/2019 | Leh | |
| D866,178 S | 11/2019 | Jin | |
| D866,276 S | 11/2019 | Shlaferman | |
| D866,964 S | 11/2019 | Tran | |
| D868,463 S | 12/2019 | Tran | |
| 10,512,316 B2 | 12/2019 | Haarburger | |
| D875,490 S | 2/2020 | Barr | |
| D877,594 S | 3/2020 | Liang | |
| D878,891 S | 3/2020 | Polczynski | |
| D878,893 S | 3/2020 | Kao | |
| D879,580 S | 3/2020 | Spater | |
| 10,595,611 B2 | 3/2020 | Berkley | |
| D881,671 S | 4/2020 | Kao | |
| D884,339 S | 5/2020 | Li | |
| D884,792 S | 5/2020 | Swallow | |
| D887,708 S | 6/2020 | Tran | |
| D893,975 S | 8/2020 | Tran | |
| 10,791,808 B2 | 10/2020 | Kane | |
| D904,016 S | 12/2020 | Jacobsen | |
| D908,351 S | 1/2021 | Hoffman | |
| 2002/0179463 A1 | 12/2002 | Newman | |
| 2007/0109130 A1 * | 5/2007 | Edenfield | G06K 19/07327 343/841 |
| 2009/0199940 A1 | 8/2009 | Toner | |
| 2012/0228168 A1 | 9/2012 | Kitchen | |
| 2013/0056119 A1 | 3/2013 | Henriette | |
| 2013/0135103 A1 * | 5/2013 | Hollaway | A45C 11/184 150/147 |
| 2013/0276943 A1 | 10/2013 | Minn et al. | |
| 2014/0143958 A1 | 5/2014 | Barr | |
| 2015/0240524 A1 | 8/2015 | Olroyd | |
| 2016/0206065 A1 * | 7/2016 | Ehrlich | A45C 1/06 |
| 2016/0374443 A1 | 12/2016 | Kim | |
| 2017/0035169 A1 | 2/2017 | Haarburger | |
| 2017/0119115 A1 | 5/2017 | King | |
| 2017/0265610 A1 | 9/2017 | Smith | |
| 2018/0325228 A1 | 11/2018 | Leimer | |
| 2018/0368547 A1 * | 12/2018 | Grannan | A45C 11/182 |
| 2019/0008253 A1 | 1/2019 | Deng | |
| 2020/0077758 A1 | 3/2020 | Hoffman | |
| 2020/0229557 A1 | 7/2020 | Tran | |
| 2020/0379509 A1 | 12/2020 | Coward | |
| 2021/0112935 A1 | 4/2021 | Tran | |

OTHER PUBLICATIONS

Onward Innovation—RFID Carbon Fiber Cash Strap Wallet—Downloaded Apr. 9, 2021—Available from Internet <URL: https://onwardinnovation.com/products/rfid-carbon-fiber-cash-strap-wallet?variant=31920056205360&currency=USD>.

(56) References Cited

OTHER PUBLICATIONS

Ridge—Aluminum-Black—Downloaded Apr. 9, 2021—Available from Internet <URL: https://ridge.com/products/aluminum-black?>.
Titan X—Titan X | Pro Edition—Downloaded Apr. 9, 2021—Available from Internet <URL: https://titanxwallet.com/products/edition?currency=USD&variant=33003264409643>.
Alpine Swiss—Alpine Swiss Genuine Leather Super Thing Slim Cash Strap Front Pocket Wallet—Downloaded Apr. 9, 2021—Available from Internet <URL: https://www.alpineswiss.com/alpine-swiss-genuine-leather-super-thin-slim-cash-strap-front-pocket-wallet/>.
Simple Zone—Carbon Fiber Wallet for Men, Simple Zone RFID Blocking Slim Minimalist Card Holder Wallet with Money Clip and Cash Strap—First available Jun. 18, 2020—Downloaded Apr. 9, 2021—Available from Internet <URL: https://www.amazon.com/Carbon-Simple-Zone-Blocking-Minimalist/dp/B08BG4G8GJ>.
Dango Products—T01 Tactical Bifold Wallet-Spec-Ops-Blueline—Downloaded Apr. 9, 2021—Available from Internet <URL: https://www.dangoproducts.com/products/t01-tactical-bifold-wallet-blueline-spec-ops?variant=21433891881044>.
Dango Products—M1 Maverick Wallet—First available Jan. 12, 2019—Downloaded May 24, 2021—Available from Internet <URL: https://www.amazon.com/dp/B07MMDRGCV/ref=as_li_ss_tl?ie=UTF8&linkCode=sl1&tag=k1a209-20&linkId=8c261f44b8217cb2913188b624fa5e66&language=en_US>.
Dango Products—M1 Maverick Bifold Wallet—Video by user Dango Products—First available Nov. 29, 2018—Downloaded May 24, 2021—Available from Internet <URL: https://www.youtube.com/watch?v=kqF_xCWWLOU>.
Muradin—Dapper Leather Bifold Wallet—First available Nov. 22, 2020—Downloaded May 24, 2021—Available from Internet <URL: https://www.amazon.com/MURADIN-Dapper-Leather-Bifold-Wallet/dp/B07ZPXH81N?th=1>.
Dango Products—A10 Adapt Wallet—Downloaded May 25, 2021—Available from Internet <URL: https://www.dangoproducts.com/collections/a-series-wallets/products/a10-adapt-wallet>.
Hanker—Carbon Fiber Aluminum Metal Minimalist Wallet—First available Feb. 7, 2019—Downloaded May 25, 20219—Available from Internet <URL: https://www.amazon.com/Carbon-Aluminum-Minimalist-Wallet-Blocking/dp/B07NHK6P55>.
ELV—ELV Badge Holder Wallet—First available Jan. 21, 2019—Downloaded May 25, 2021—Available from Internet <URL: https://www.amazon.com/ELV-Aluminum-Release-Offices-License/dp/B07MZJYVBX/ref=asc_df_B07MZJYVBX/?tag=hyprod-20&linkCode=df0&hvadid=312158528332&hvpos=&hvnetw=g&hvrand=11777945990320224546&hvpone=&hvptwo=&hvpqmt=&hvdev=c&hvfvcmdl=&hvlocint=&hvlocphy=9008148&hvtargid=pla-653426231968&psc=1>.
Elephant Wallet—N Wallet Carbon Fiber-Fabric Rubber—Downloaded Mar. 17, 2021—Available from Internet <URL: https://elephantwallet.com/products/n-wallet-carbon-fiber>.
Elephant Wallet—How Does It Work (X Wallet)—Downloaded Mar. 17, 2021—Available from Internet <URL: https://elephantwallet.com/pages/how-does-it-work>.
Wallet Gear—Bifold Leather Wallet with Elastic Band—Downloaded Mar. 17, 2021—Available from Internet <URL: https://www.walletgear.com/bifold-leather-wallet-with-elastic-band.html>.
Curated Basics—Elastic Band Minimalist Wallet—Downloaded Mar. 17, 2021—Available from Internet <URL: https://www.curatedbasics.com/products/elastic-band>.

* cited by examiner

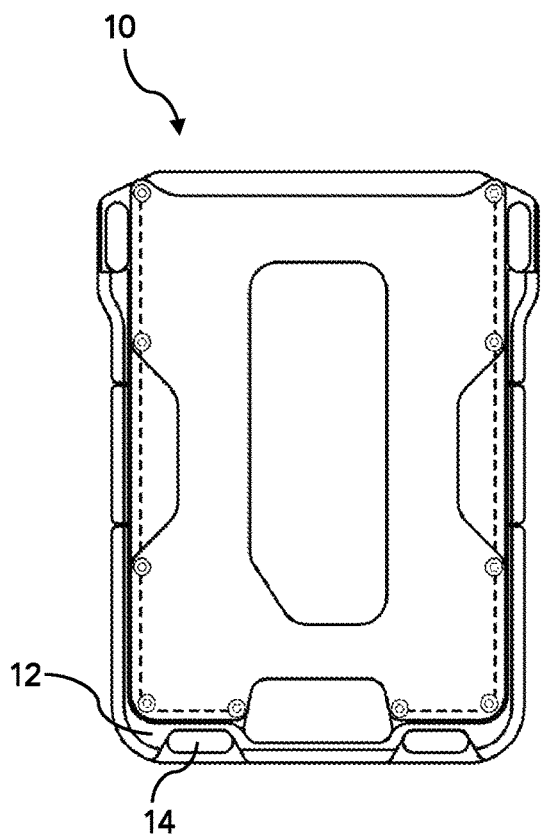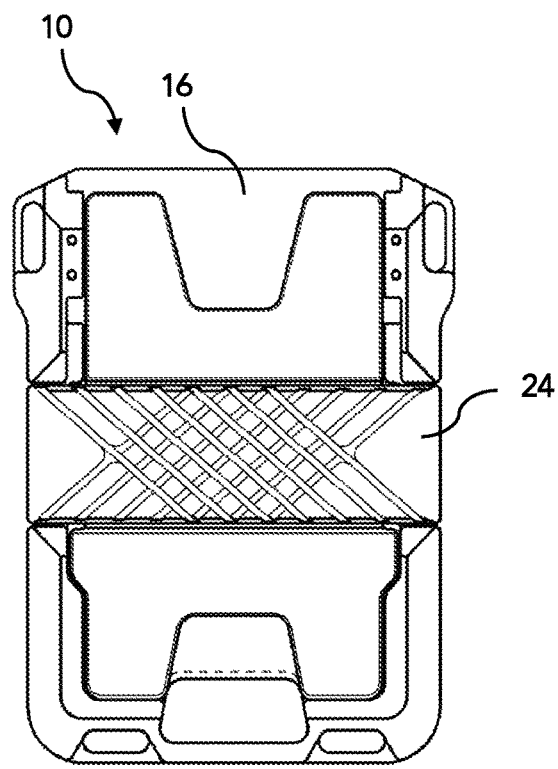
Figure 1  Figure 2
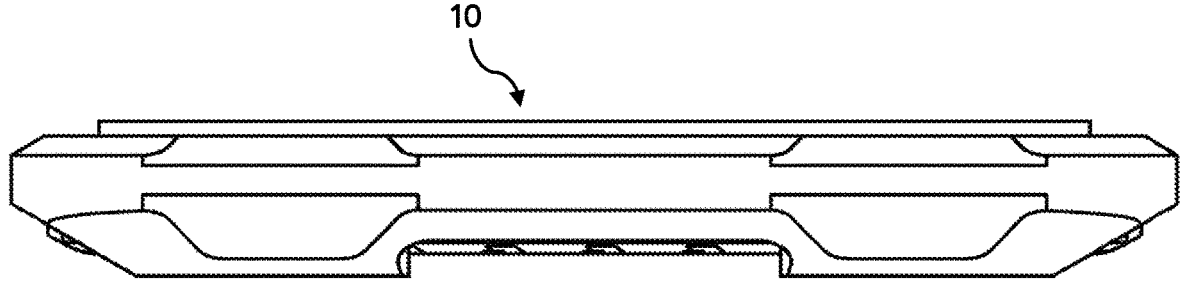
Figure 3
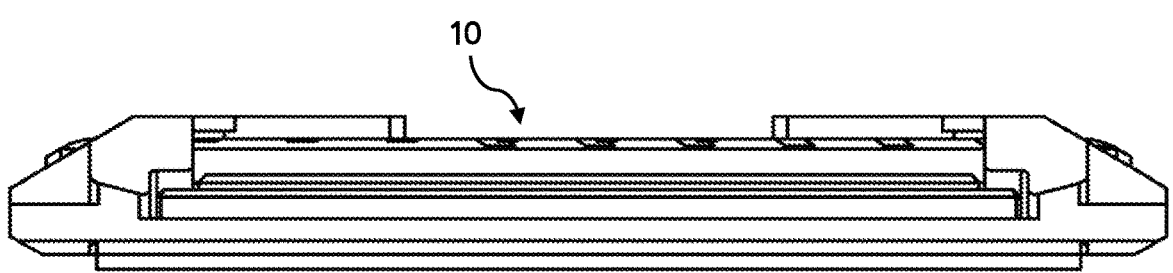
Figure 4

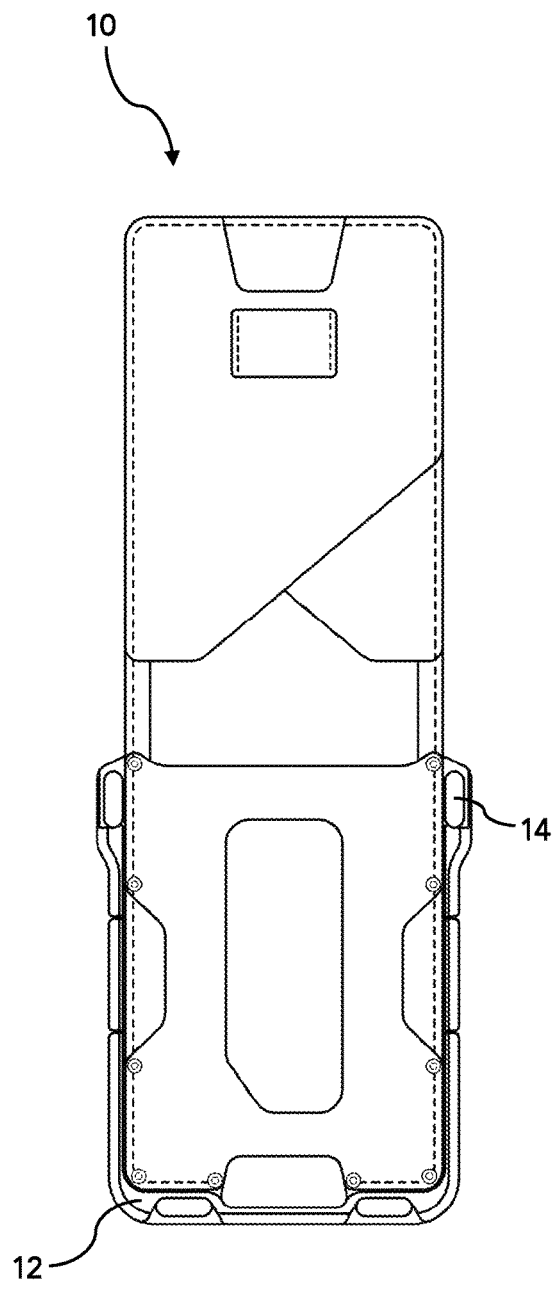
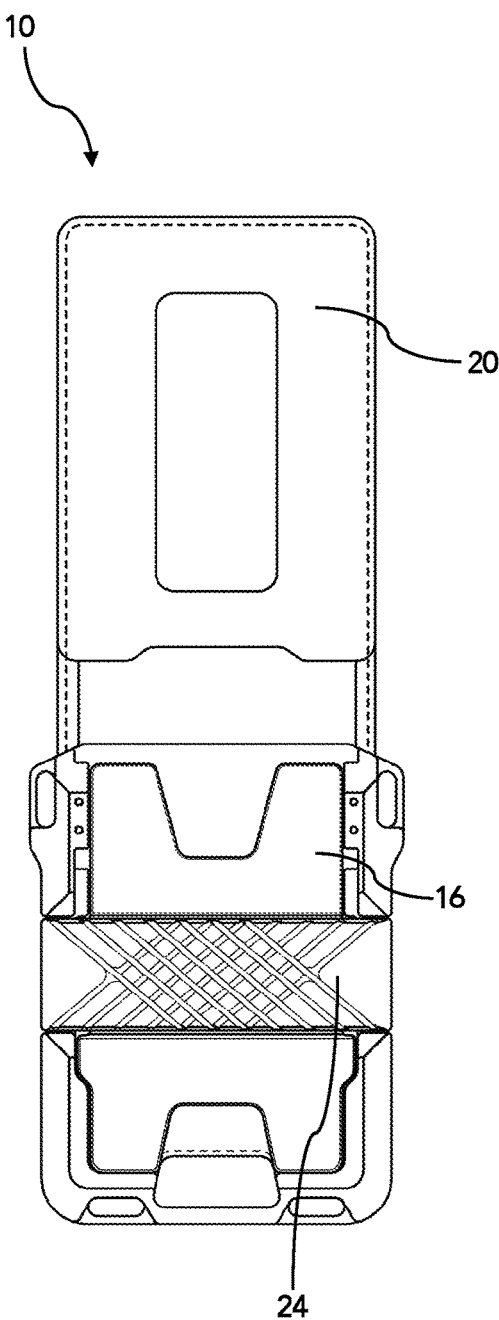
Figure 9
Figure 10

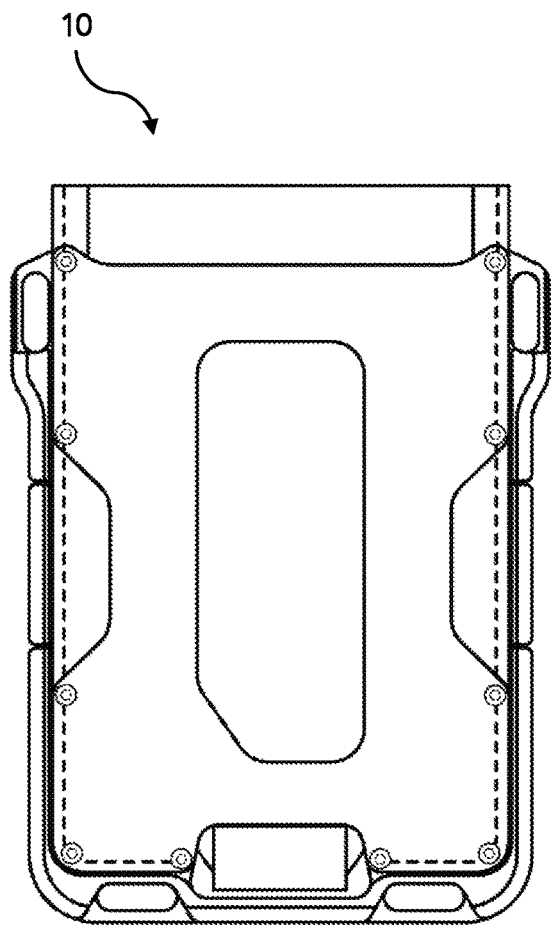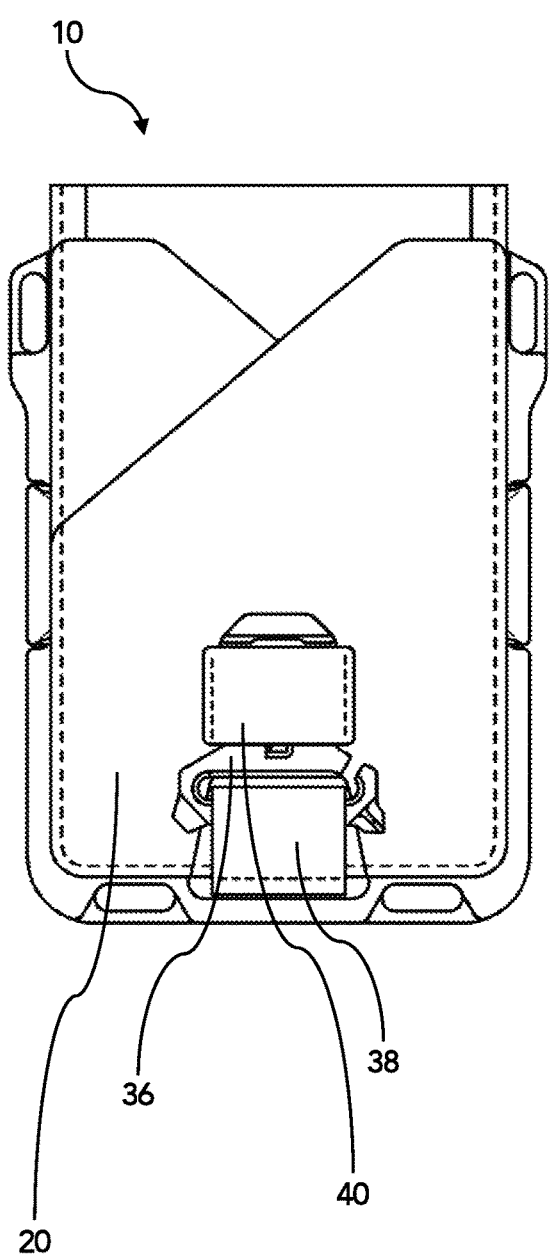
Figure 20
Figure 21

WALLET

TECHNICAL FIELD

The present invention relates to wallets and systems and methods for manufacturing a wallet.

BACKGROUND

The statements in this section merely provide background information related to the present disclosure and may not constitute prior art.

The use of wallets is well-known. Wallets are designed to carry articles such as credit cards, currency, business cards, pictures, keys, identification cards, licenses (such as a driver's license), plus assorted other paper items. The most common type of wallet has one or more compartments and is made to be carried in a pocket, specifically in one's back trouser's pocket. These wallets are, in general, made from fabric and/or leather goods and sewn to form storage pockets. They may also utilize a metal clip of sorts intended to hold paper currency. These storage pockets are typically sewn to hold one card or a few cards. Each pocket adds a layer of material, increasing the wallets overall thickness and limiting the amount of cards a wallet can carry. The result is that the wallet becomes bulky in size and if carried in one's trousers, the wallet can produce a significant, uncomfortable bulge.

Known wallets are additionally disadvantaged by stretching and become loose over time, leaving the cards and identification vulnerable to falling out and becoming lost, leaving the owner exposed to the possible threat of identity theft.

One known solution utilizes a clip to attempt to hold cards and currency without the use of fabric or leather. These money clips are sometimes used alone to hold currency or they are integrated into a container to hold the cash with the users cards. In either case the cards security is based on the spring tension of the clip. Theses clips, because of the spring tension, limit the maximum amount of cards a user can carry. Money clips are additionally problematic when used with a few items, as less tension is available to hold the items securely. Furthermore, personal credit cards and security cards are vulnerable to Radio Frequency Identification (RFID) theft in a conventional clip-based holder, wallet and purse.

SUMMARY

In one aspect, a wallet includes a first shell with one or more openings on a shell perimeter adapted to clip one or more objects to the one or more openings; and a second shell coupled to the first shell, the second shell including a storage compartment; and first and second rails on each side of the second metal shell to slideably receive one or more cards in the storage compartment.

In another aspect, a method for storing cards includes forming a first shell with one or more openings on a shell perimeter adapted to clip one or more objects to the one or more openings; coupling a second shell to the first shell with a storage compartment therein; and providing two rails on the sides of the second shell with a spring-like head to slidably receive a card in the storage, further comprising generating a click upon full receipt of the card.

Implementations may include one or more of the following. When the "rails" are attached to the shell, it turns the wallet into an ID wallet—or in other words, a card slot that keeps the card that you store exposed to easy RFID access, easy identification or easy access of some of the user's most used cards. The two "rails" have a machined cavity which becomes the "Tracks" for the cards to slide in and out of the wallet. What keeps the cards from falling out are three things: a barrier on the front face that prevents the cards from falling out on a "Z" axis, a restriction on the bottom of the rails to prevent the cards from sliding freely through the bottom; a barrier on bottom of the rails to prevent the cards from sliding through the bottom, and a flexing arm to create a spring like flex to allow cards to slide in/out, but not to fall out. The restriction can be a barrier on the bottom but the restriction can also be a door, a latch or a tension spring that will prevent the cards from falling through unsecured. In another embodiment, the tension arm can be placed both on the top and the bottom of the wallet. The flexing "arm" feature of each metal rails are placed at the top portion of the wallet that are machined to create a "springing" mechanism to flex just enough to allow cards to slide in and out in a restricted way. When cards are slid in and out, this restriction creates a "satisfying" clicking noise and feel and allows a smooth and secure grasp of the cards. Essentially, these flexing arms are like the gates for cards.

In a further aspect, a wallet includes a first metal shell with one or more openings on a shell perimeter adapted to clip one or more objects to the one or more openings; a second metal shell coupled to the first shell with a storage compartment therebetween; and securing a soft material to the first and second metal shells, wherein the soft material comprises compartments to store cards or money therein.

Implementations of the above aspect may include one or more of the following. The shell combines CNC machined and anodized aluminum with top grain leather; a fine mixture of industrial hardware and plush elegance. The chassis has 4 Loop Holes incorporated into each corner to attach keys, lanyards and Tethers for both lefties and righties. The surface of the chassis is anodized slate grey and assembled with jet Black or whiskey brown leather. The wallet can be a single wallet or a bifold wallet. The Bifold Wallet variant comes equipped with a high capacity 4 pocket bifold leather (holds up to 3-4 cards per pocket) held together by mil-spec stainless steel bolts. The front and inner leather pocket is designed for easy access to ID cards and more frequently used cards. Push notches are provided to allow the thumb to easily push cards out of the wallet for access. The metal RFID blocking card cavity can hold up to 6 cards depending on card thicknesses. Military Specified hex screws can be used to attach the two shells together. A silicone wallet band can be wrapped around one or both shells to secure paper or cash to the wallet.

Advantages may include one or more of the following. The metal wallet surprisingly retains a slim & sleek profile while holding its maximum capacity of 14-16 cards+cash. The wallet is elegant and sophisticated with an industrial edge which sets it apart from other slim wallet designs. Inspired by military, first responders, and hardcore preppers, the utility vertical wallet has a robust yet sleek design that is built for the rugged and tactical lifestyle. This wallet is the perfect companion for the everyday survivalist. The wallet combines CNC Machined aluminum with a DTEX material; a fine mixture of an industrial "bullet-proof" chassis with a wallet skin that is resilient, flexible and water resistant. The surface of the M1 chassis is ceramic coated with Cerekote—a firearms industry standard ceramic paint tough enough to withstand rough handling. The Single Pocket variant comes with its pairing Multi-Tool which has over 10 functions which are specifically designed to respond to life threatening and emergency situations. The functions of the multi-tool include: a seat belt cutter, serrated/sharpened edges, chisel, 2 paracord tensioners, an 02 oxygen wrench, nail pryer, standard ¼" inch hex wrench, and of course, a bottle opener. The tool or accessory slides into the metal cavity where the cards sit and is nested securely onto the safety locks on the chassis.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 shows a front view while FIG. 2 shows a back view of a single pocket embodiment.

FIG. 3 is a top view of a wallet in one embodiment.

FIG. 4 is a bottom view of a wallet in one embodiment.

FIG. 7 shows a front view of a bifold embodiment, while FIG. 8 shows a back view of a bifold embodiment in a closed position.

FIG. 9 shows a front view of a bifold embodiment, while FIG. 10 shows a back view of a bifold embodiment in an open position.

FIGS. 16-17A show exemplary front and side views of an accessory that can be embedded in the wallet.

FIGS. 17B-17C show exemplary first position, second position of the locking mechanism of the accessory, while

FIG. 20 shows a front view of second bifold embodiment, while FIG. 21 shows a back view of this bifold embodiment in a closed position.

FIG. 22 shows a front view of the bifold embodiment of FIG. 19, while

FIGS. 24-25 show the left and right views of the second bifold embodiment in a closed position, while

FIG. 28 shows a top view of the second bifold embodiment, while

DETAILED DESCRIPTION

Figure 5:
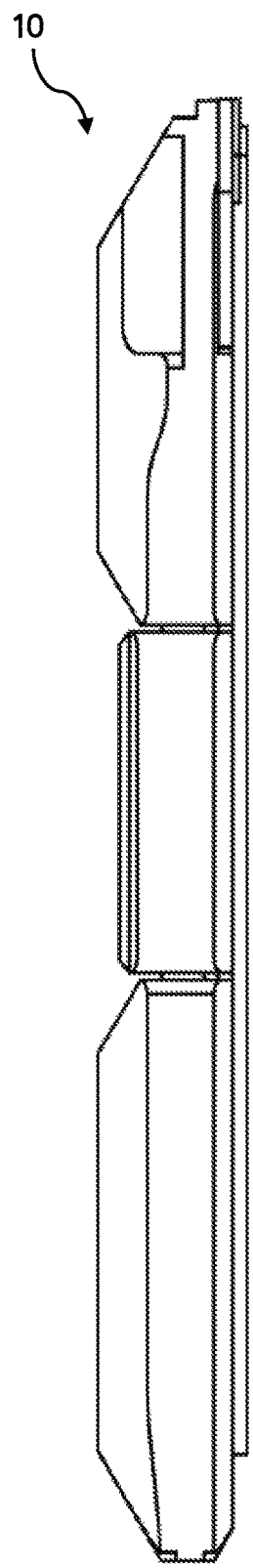
FIGS. 5 and 6 show left and right-side views of the single pocket embodiment.

Various embodiments of the present invention will be described in detail with reference to the drawings, where like reference numerals represent like parts and assemblies throughout the several views. The FIGS. illustrate an exemplary embodiment of a wallet and a method for assembling the same, wherein the depictions are for the purpose of illustrating certain exemplary embodiments only and not for the purpose of limiting the same. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Based on the foregoing, it is to be generally understood that the nomenclature used herein is simply for convenience and the terms used to describe the invention should be given the broadest meaning by one of ordinary skill in the art.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 6:
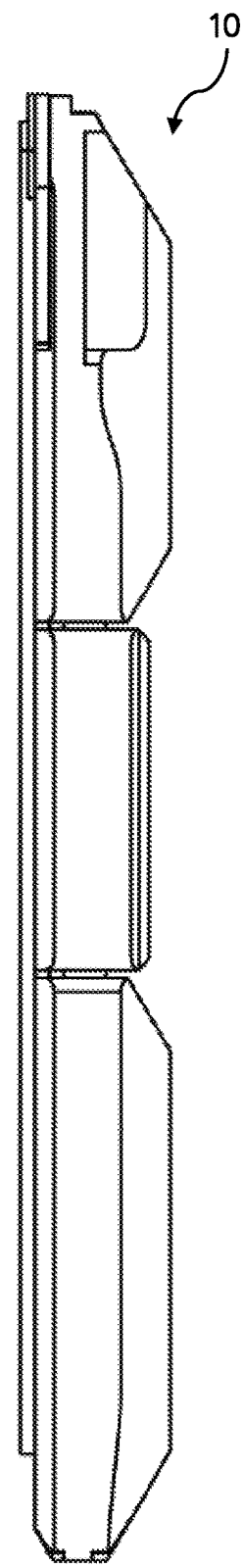

FIG. 1 shows a front view while FIG. 2 shows a back view of a single pocket embodiment called the M1 or Maverick. FIG. 3 is a top view of a wallet indicated by reference character 10 throughout the Figures, while FIG. 4 is a bottom view of the wallet in one embodiment, while FIGS. 5 and 6 show left and right-side views of the single pocket embodiment.

In this embodiment, the M1 combines CNC machined and anodized aluminum with top grain leather; a fine mixture of industrial hardware and plush elegance. The chassis, indicated by reference character 12 in FIG. 1, has 4 Loop Holes, indicated by reference character 14 in FIG. 1, incorporated into each corner to attach keys, lanyards and tethers for both lefties and righties. The surface of the M1 chassis is anodized slate grey and assembled with jet Black or whiskey brown leather, among others.

In an embodiment, the wallet may be used for securing financial instruments, organizing and carrying currency, credit cards, identification cards (such as a driver's license) and any such item generally carried about one's person. It is contemplated that the size and shape of the container may be adapted for use for particular articles. For example, in another embodiment, the wallet may be sized and adapted for use as a container for business cards. A clip in this embodiment is generally configured for holding paper currency, although it may function to hold a number of varying articles. In yet another embodiment, the clip may be used to fasten the container to another object such as a pocket, personal organizer, or book, for example.

Figures 7, 8:
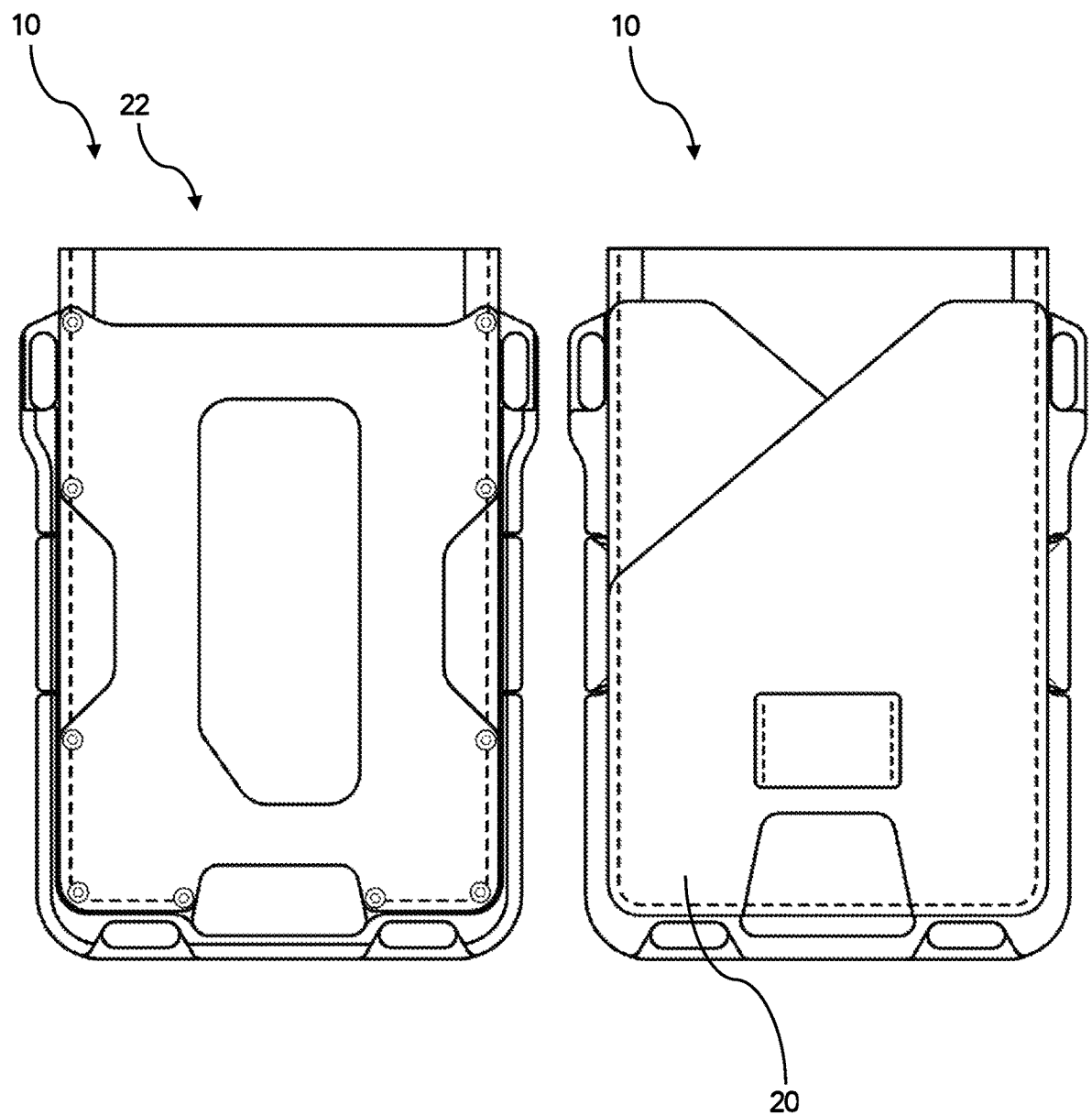

FIG. 7 shows a front view of a bifold embodiment, while FIG. 8 shows a back view of a bifold embodiment in a closed position. A small slot is provided in the back to hold a key or a flat and elongated object. This bifold wallet variant comes equipped with a high capacity 4 pocket bifold leather (holds up to 3-4 cards per pocket) held together by mil-spec stainless steel bolts. The front and inner leather pocket is designed for easy access to ID cards and more frequently used cards. A metal RFID blocking card cavity, indicated by reference character 22 in FIG. 7, can hold up to 6 cards depending on card thicknesses. The M1 Bifold Wallet surprisingly retains a slim & sleek profile while holding its maximum capacity of 14-16 cards+cash. The Maverick Wallet is elegant and sophisticated with an industrial edge which sets it apart from other slim wallet designs.

Figure 11:
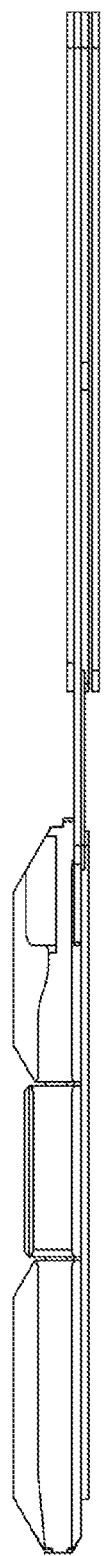
FIGS. 11 and 12 show left and right-side views of the bifold embodiment.
Figure 12:
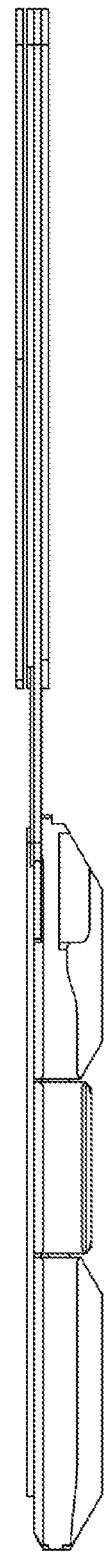
Figure 13:
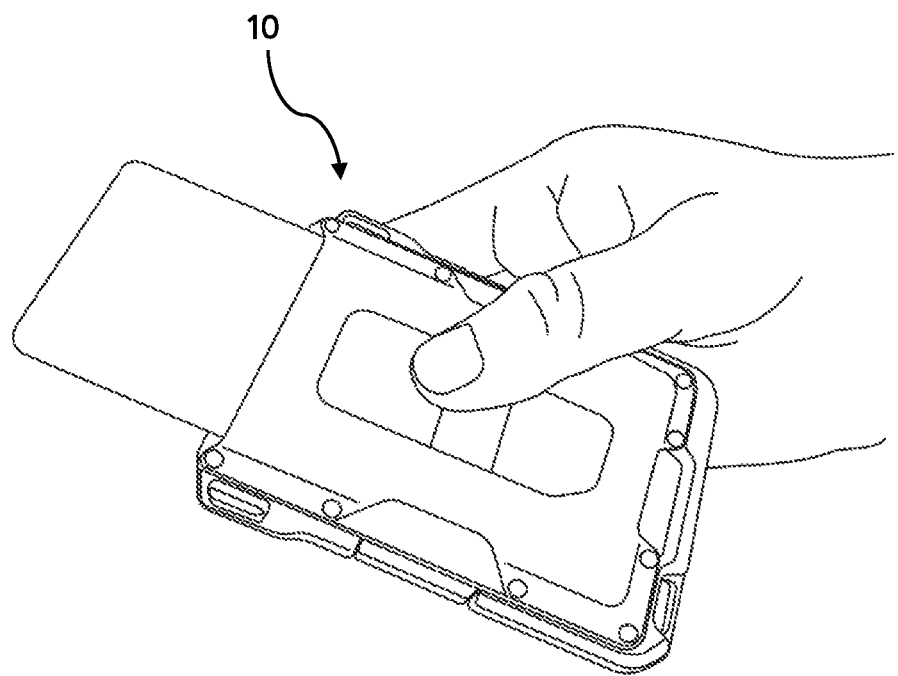
FIGS. 13 and 14 show front and back views of the bifold embodiment.
Figure 14:
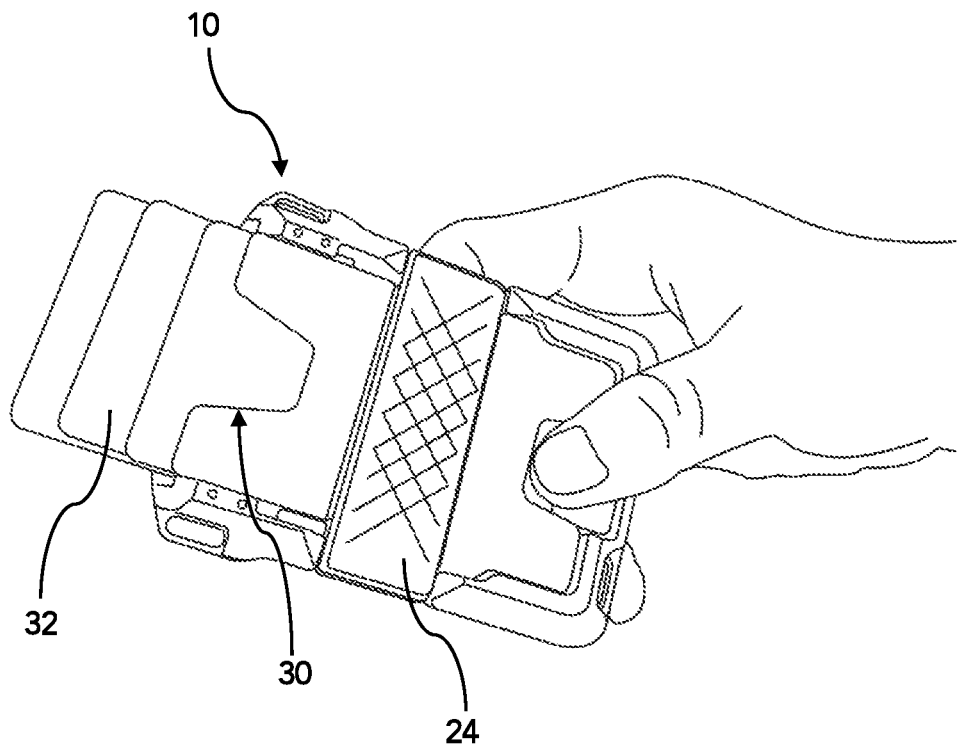

FIG. 9 shows a front view of a bifold embodiment, while FIG. 10 shows a back view of a bifold embodiment in an open position. FIGS. 11 and 12 show left and right-side views of the bifold embodiment. FIGS. 13 and 14 show front and back views of the bifold embodiment. The front has a pocket such as a leather pocket with a clearance area or opening to access cards by pushing with the thumb and pulling from the top. The back of the wallet has an RFID protection plate, indicated by reference character 16 in FIG. 10, that covers the cards, with a small opening or insert at the bottom to push the cards forward where they can be removed from the wallet. The cards may include, for example, credit cards, public transportation cards, driver's license, swipe cards, or any other type of card. Many users, or people, have one or more cards that they use daily or frequently, which may be referred to in the present disclosure as "frequent-use cards." Many users, or people, also have one or more additional cards that they may use less frequently than those of daily use but may still want to carry those cards in their wallets. These less frequently used cards may be referred to in the present disclosure as "occasional-use cards." In some embodiments, the wallet may be configured to store the frequent-use cards in a manner that allows immediate access to the frequent-use cards. In some embodiments, the wallet may also be configured to store the occasional-use cards in a manner that allows easy access to the occasional-use cards.

As one skilled in the art will readily recognize, the RFID shielding material can be included using various techniques. The radio frequency shielding material can include a conductive material such as a metal or an electrically conductive plastic. The RFID shielding can be integral of the wallet material or attached using adhesive as a thin lining, in one embodiment. The radio frequency shielding material can include a mesh with a mesh size small enough to provide shielding against the radio frequency range used by RFID readers. In many embodiments the RFID shielding material is either flexible, transparent, or both. Examples of suitable RFID shielding materials include metal-coated elastomers such as aluminized Mylar and copper-coated plastic sheets and films. In some embodiments, the RFID shielding material is a semi-transparent mesh. Enveloping identification cards or credit cards with a material that blocks radio frequencies, keeps information stored on the cards secure while in the closed wallet. Additionally, forming the wallet of materials that include metal materials that block or absorb radio frequencies will also protect the information stored on the cards.

In some embodiments, the RFID shielding material is effective to form a Faraday cage around the ID, object, or key. Closing the closure can be effective to complete the Faraday cage, in some instances. In other embodiments, the RFID shielding is used in selective locations in the holder. The RFID shielding shields an RFID tag from a reader in two ways. First, the RFID shielding greatly reduces the power being broadcast from the reader that reaches the RFID tag within the holder. This cuts the power available to the RFID tag to transmit information back. Secondly, even if the RFID tag receives enough power to transmit, the signal sent from the RFID tag is also attenuated. Accordingly, it will be appreciated that the effectiveness of the RFID shielding can be varied considerably based on choices of radio frequency shielding materials and their thicknesses, mesh sizes, and so forth.

Figure 15:
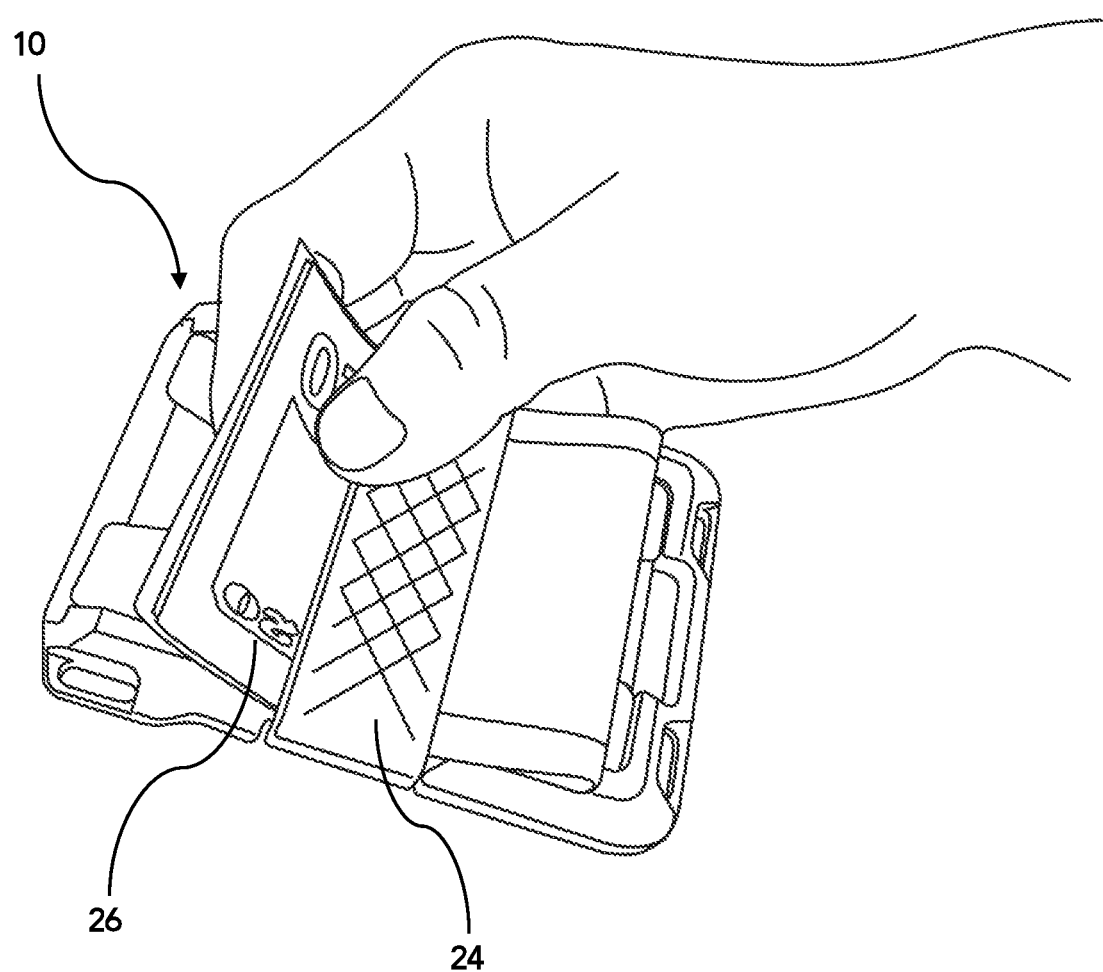
FIG. 15 shows a money band that encircles the body of the wallet to secure paper money to the wallet.

FIG. 15 shows a money band, indicated by reference character 24 in FIGS. 14 and 15, that encircles the body of the wallet to secure paper money, indicated by reference character 26, to the wallet. The money band can be a rubber or flexible material that is slipped over the wallet and when released, tightly clamps money to the wallet.

Figure 16:
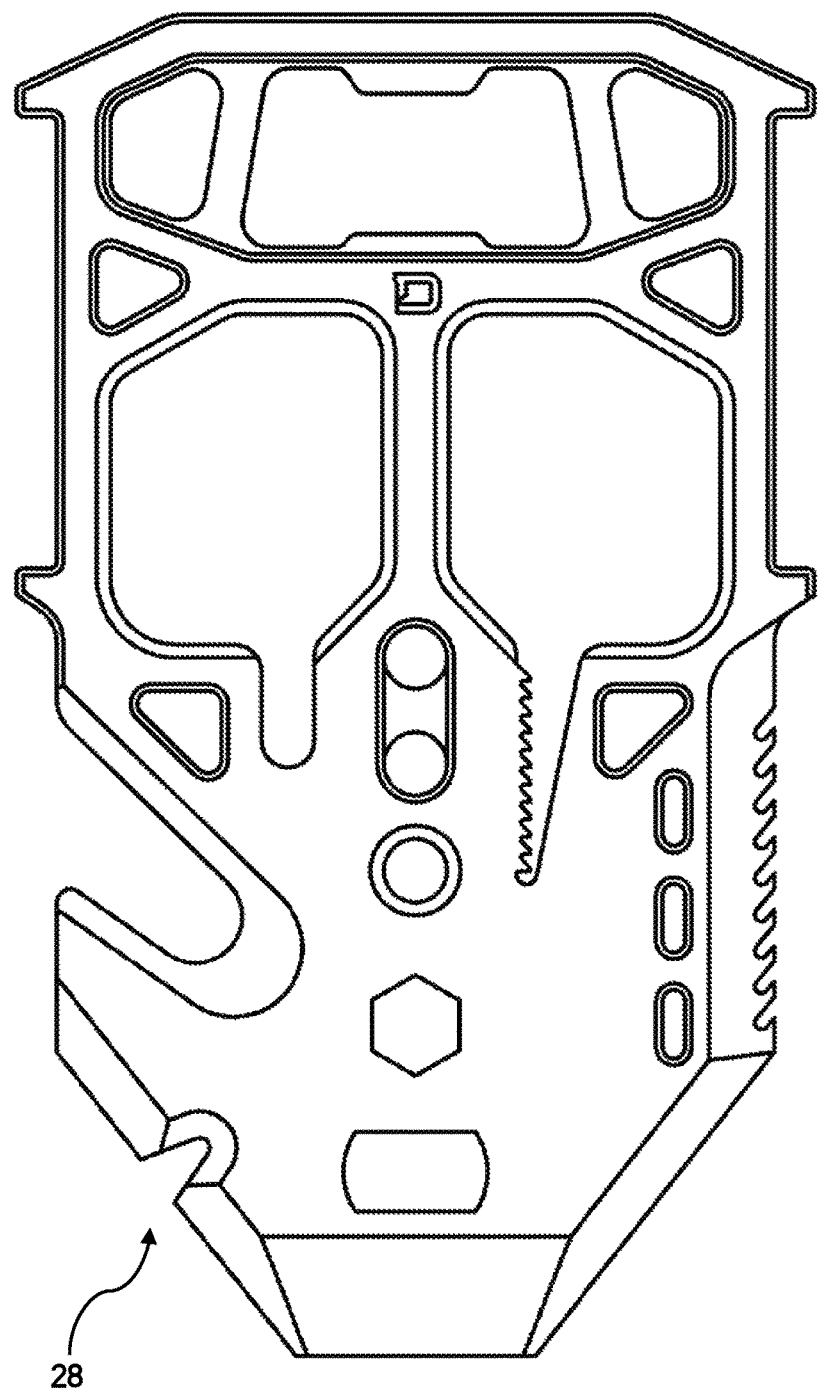
Figure 17A:
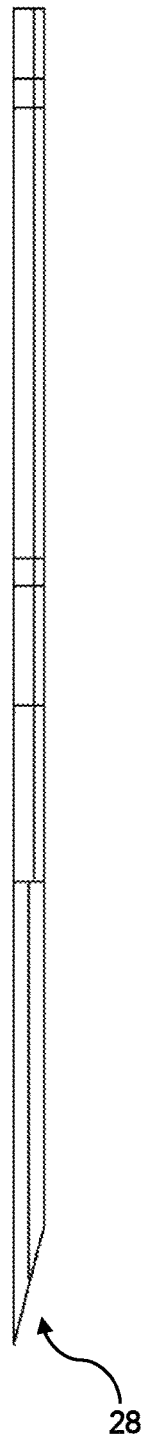
Figure 17B:
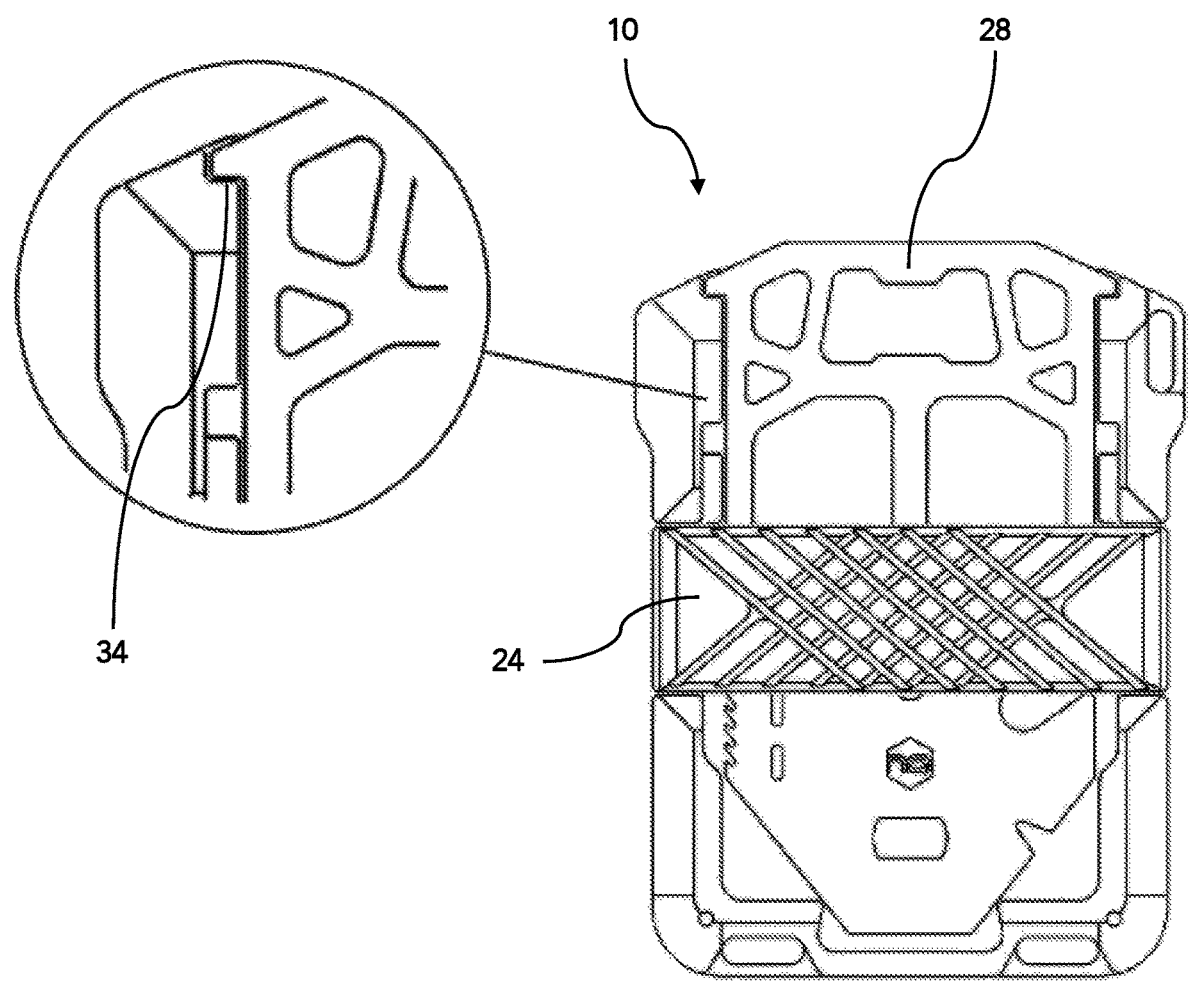
Figure 17C:
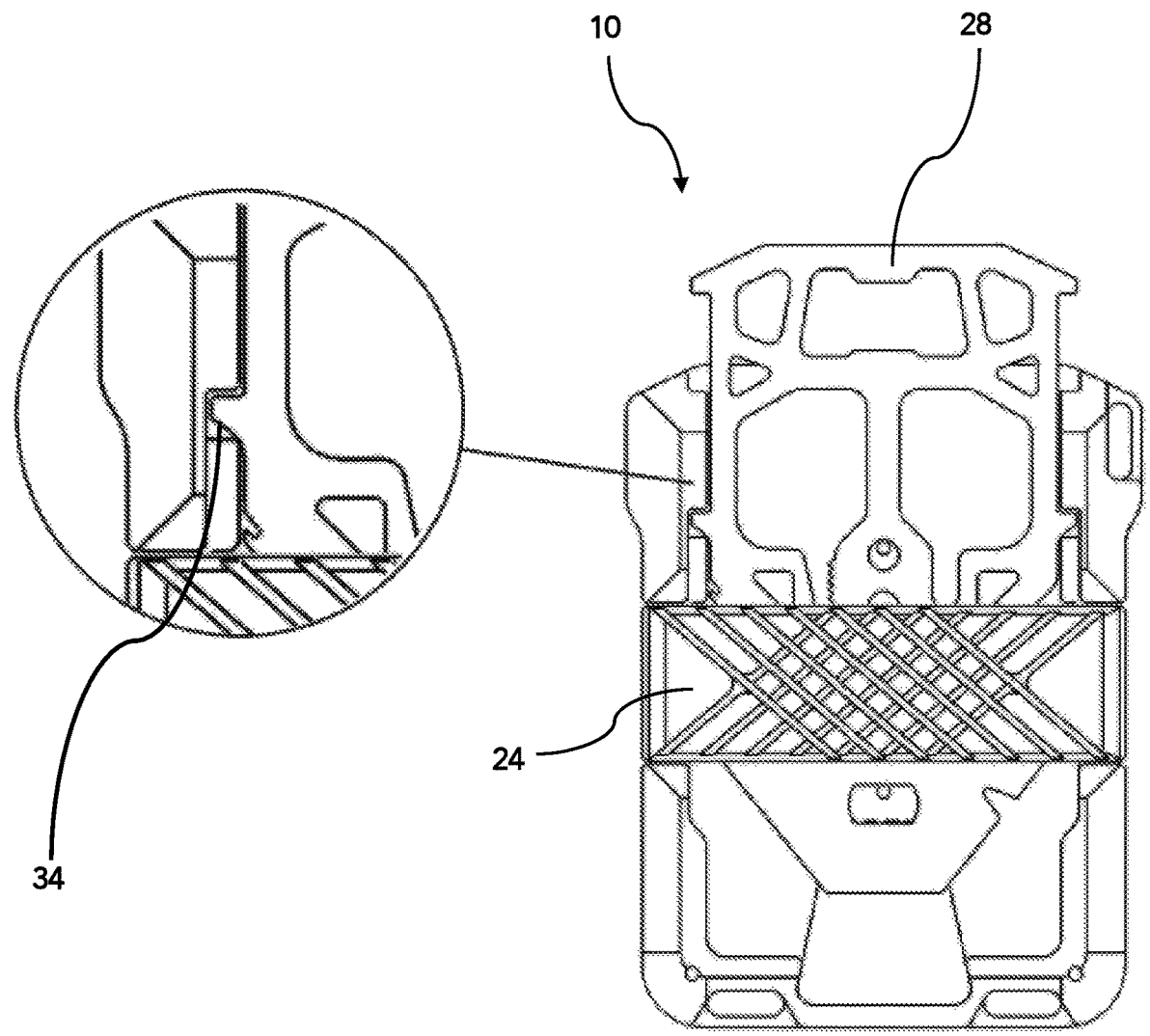
Figure 17D:
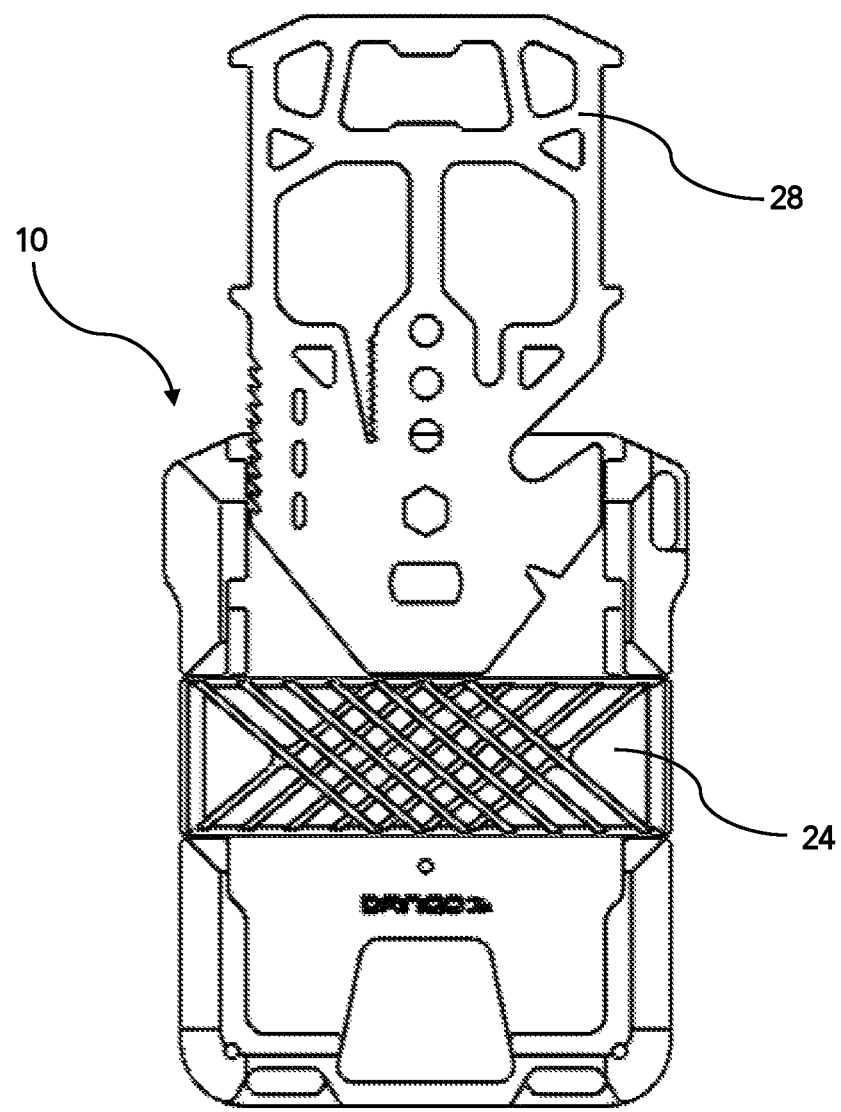
FIG. 17D shows the completely removed accessory.

Certain variants of the wallet come with a flat multi-tool, indicated by reference character 28 in FIGS. 16-17D, that is stored into the metal pocket cavity of the chassis. This multi-tool is made of heat treated stainless steel. The manufacturing process of the multi-tool consists of precision cutting the multi-tool's basic shape out of a 2 mm stainless steel sheet metal. That unit is then brought into a CNC (computer numerical control) mill to cut out the details for the multi-tool's functions. This multi-tool has several functions including a knife, bottle cap opener, multiple wrenches, nail pryer (to pry nails), and rope tensioners.

FIGS. 16-17 show exemplary front and side views of an accessory that can be embedded in the wallet. In one embodiment, the accessory is a multi-tool device which has over ten functions. In this embodiment, the multi-tool device can respond to life threatening and emergency situations. For example, the device has a seat belt cutter, serrated/sharpened edges, a chisel, two paracord tensioners, an oxygen wrench, a nail pryer, a hex wrench (such as a ¼" hex wrench), and a bottle opener. The accessory slides into a cavity, indicated by reference character 30 in FIG. 14, where the cards, indicated by reference character 32 in FIG. 14, are stored and is nested securely within the cavity with two safety locks onto the chassis.

FIGS. 17B-17C show exemplary first position, second position of the locking mechanism of the accessory, while FIG. 17D shows the completely removed accessory.

The multi-tool works with the wallet by positional points that are paired by male tabs, indicated by reference character 34 in FIGS. 17B and 17C, on the multi-tool's outer sides and female inserts on the inner sides of the wallet's metal cavity. This mechanism happens behind the silicone band and back-plate. The multi-tool has a total of 4 tabs-2 tabs on the left and right side, to offer 2 points of positions.

FIG. 17B shows the first position is a concealed position that locks the multi-tool into place inside of the chassis' metal pocket. This also helps so that the multi-tool does not fall out of the chassis. To remove the multi-tool from the chassis, the user must lift the top of the multi-tool towards him/her and pull all the way out. To insert or maneuver the multi-tool, lift the top of the tab and pull up or push down against the back-plate and silicone band.

Turning now to FIG. 17C, the second position allows the user to reveal the bottle opener on the top of the multi-tool. This is a "quick-draw" mechanism in case the user does not intend to take the multi-tool all the way out. To do this, in the closed position, the user must lift the top of the multi-tool towards him/her and pull up to engage the multi-tool against the chassis on the second row of tabs. To insert or maneuver the multi-tool, lift the top of the tab and pull up or push down into position against the back-plate and silicone band.

Figure 18:
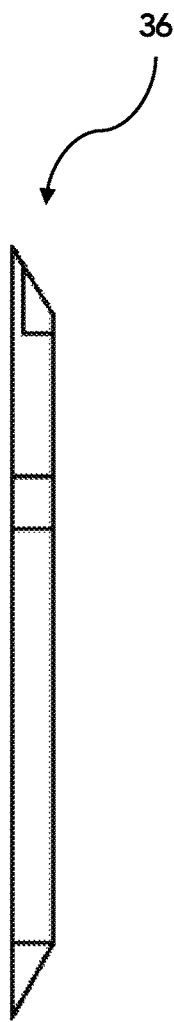
FIGS. 18-19 show exemplary side and front views of a second accessory that can be used with the wallet
Figure 19:
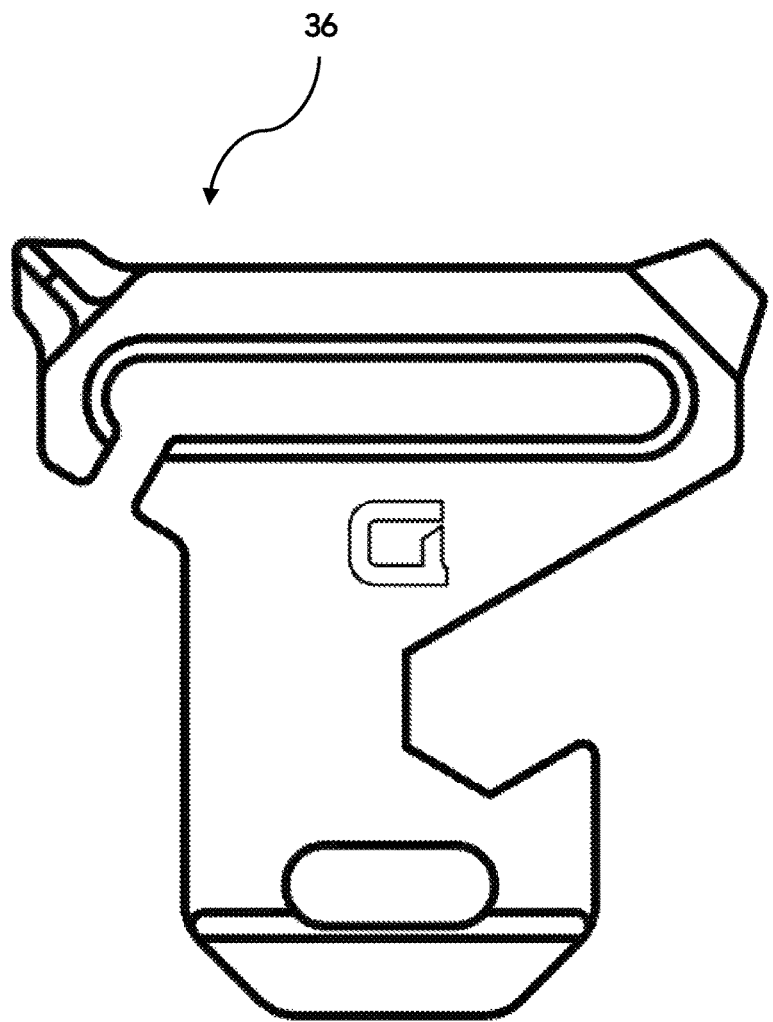

FIGS. 18-19 show exemplary side and front views of a second accessory, indicated by reference character 36 in FIGS. 18, 19, 21-23, and 31, that can be used with the wallet. This accessory fits in the bifold pocket as a miniature multi-tool device that includes five functions independent of the first accessory. The second accessory provides structures that provide functions including a small chisel, a hex wrench (such as a ¼" hex wrench), a bottle opener, a flat head and a Phillips head screw driver.

Figure 22:
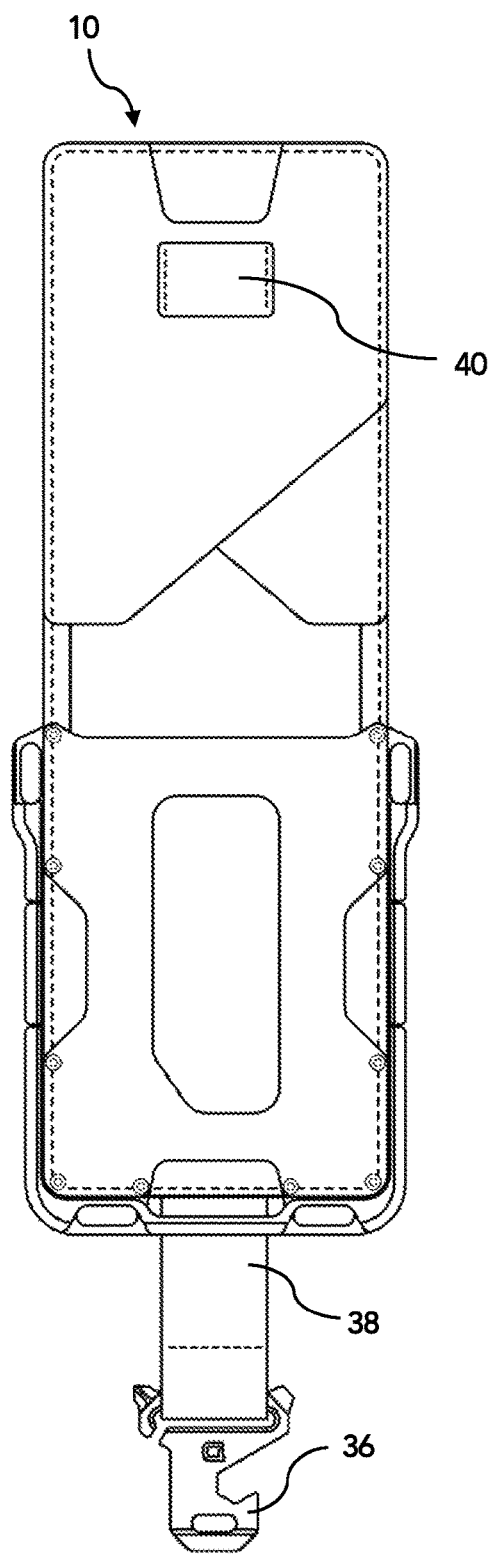
Figure 23:
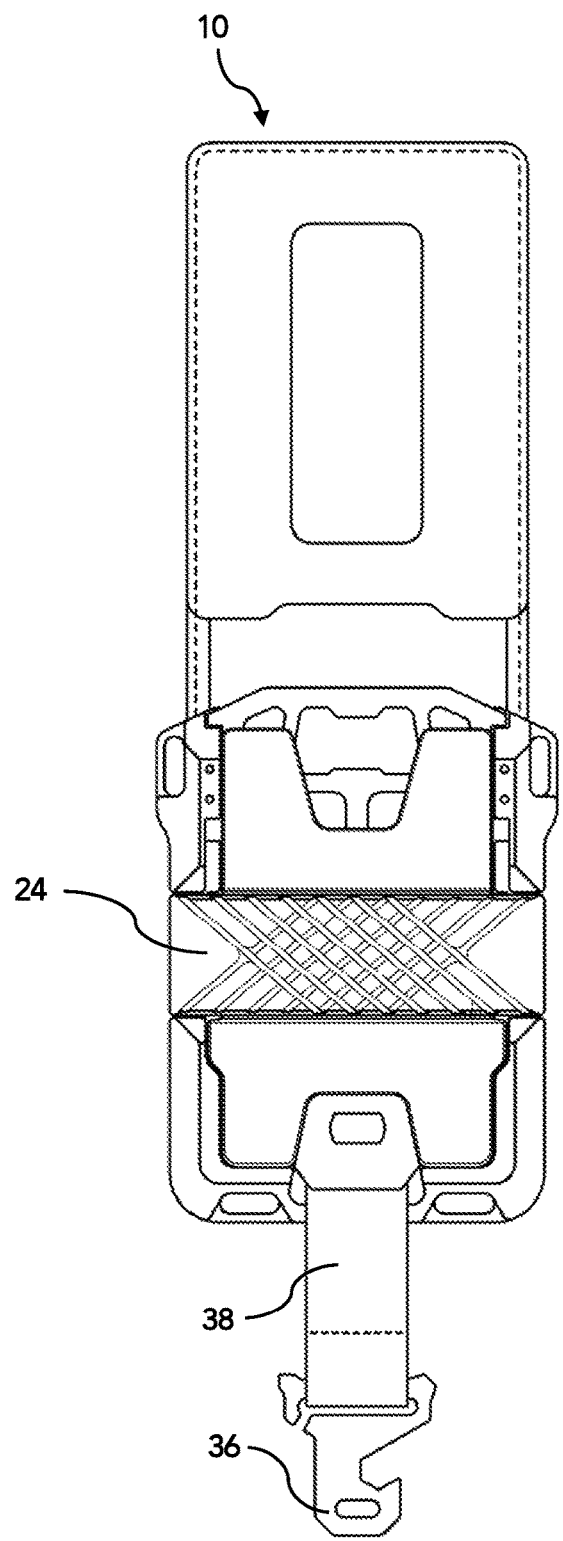
FIG. 23 shows a back view of the bifold embodiment in an open position.
Figure 24:
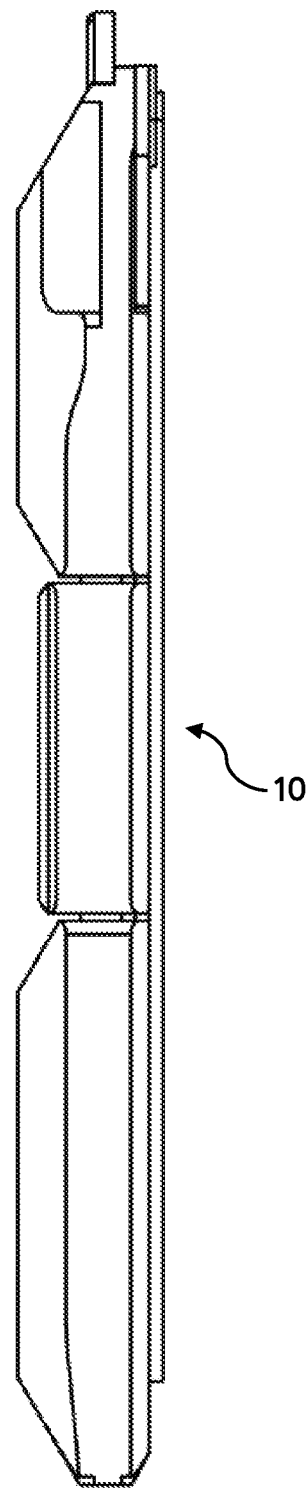
Figure 25:
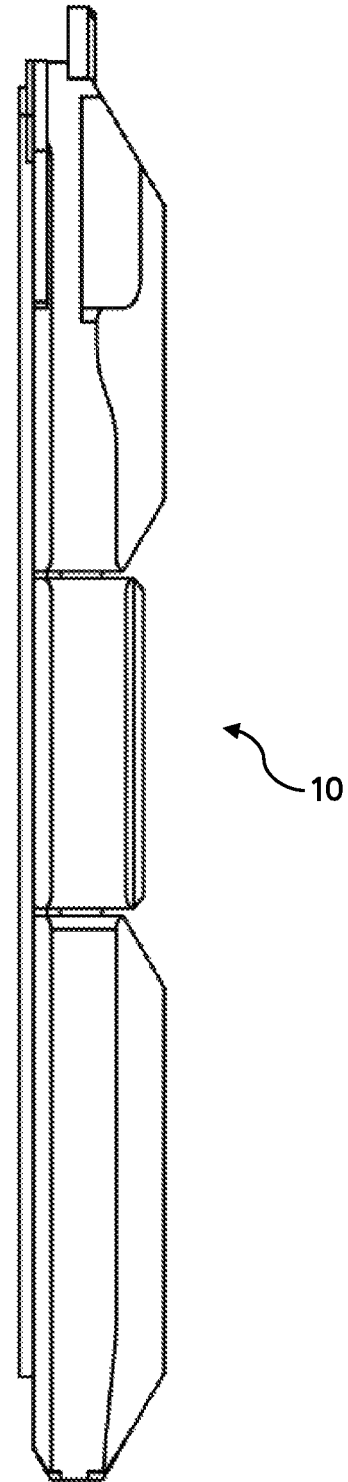
Figure 26:
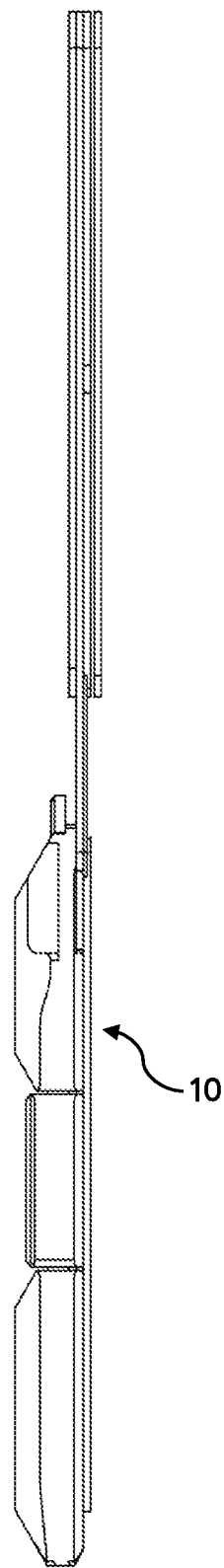
FIGS. 26-27 show the corresponding views in the open position.
Figure 27:
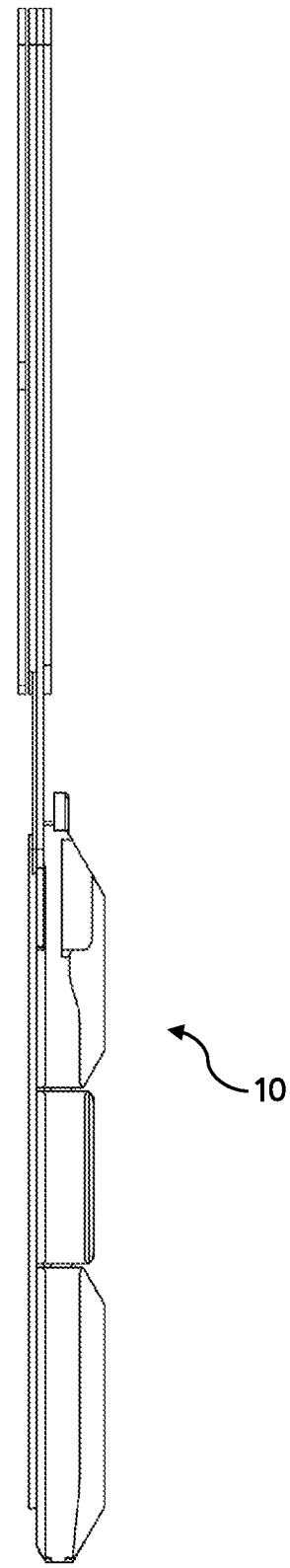
Figure 28:
Figure 29:
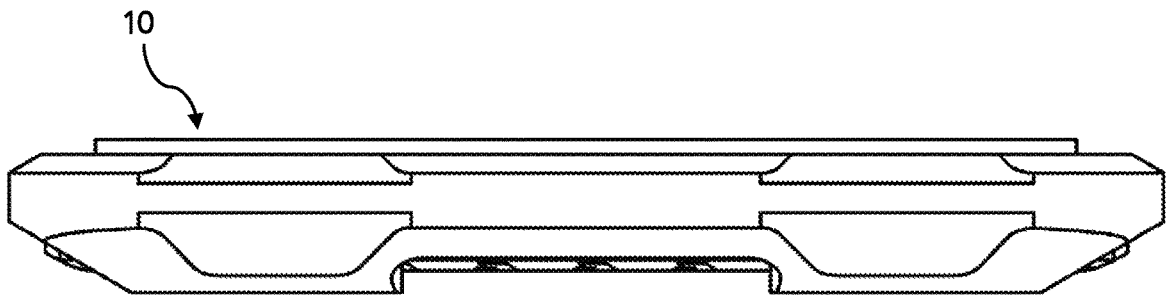
FIG. 29 shows a bottom view of the second bifold embodiment.

FIG. 20 shows a front view of the second bifold embodiment, while FIG. 21 shows a back view of this bifold embodiment in a closed position. FIG. 22 shows a front view of the bifold embodiment of FIG. 19, while FIG. 23 shows a back view of the bifold embodiment in an open position. FIGS. 24-25 show the left and right views of the second bifold embodiment in a closed position, while FIGS. 26-27 show the corresponding views in the open position. FIG. 28 shows a top view of the second bifold embodiment, while FIG. 29 shows a bottom view of the second bifold embodiment.

Figure 30:
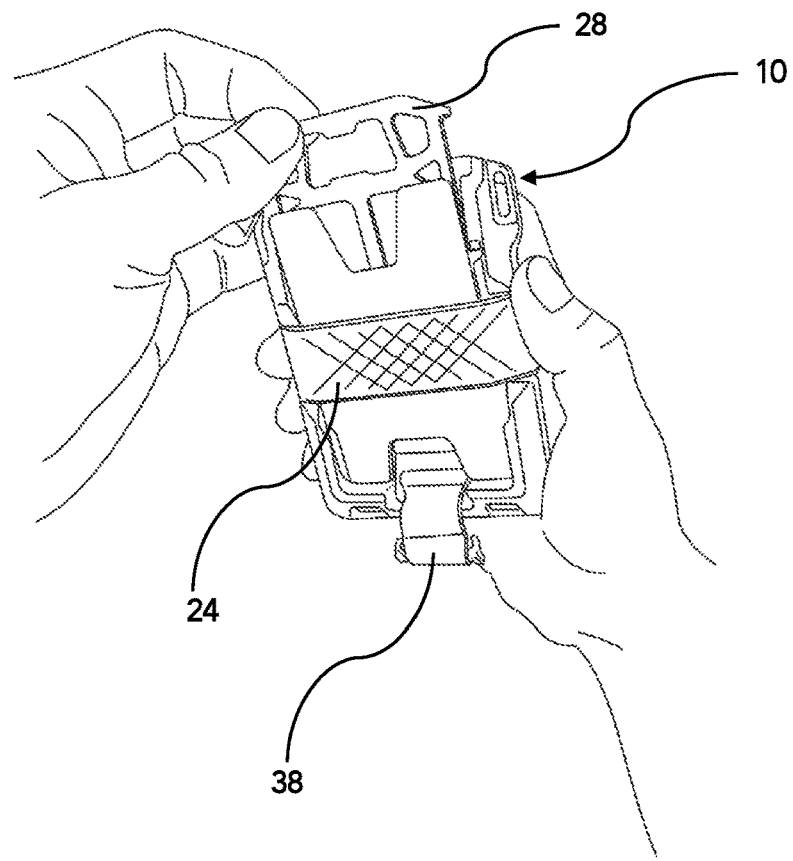
FIG. 30 illustrates the removal of the first accessory from the wallet to use the accessory.

FIG. 30 illustrates the removal of the first accessory from the wallet to use the accessory. During storage, the side tabs interlock with the wallet and cannot move. To remove the accessory or tool for use, the user pulls the accessory forward and pull up to engage the side tabs with their designated nesting areas.

Figure 31:
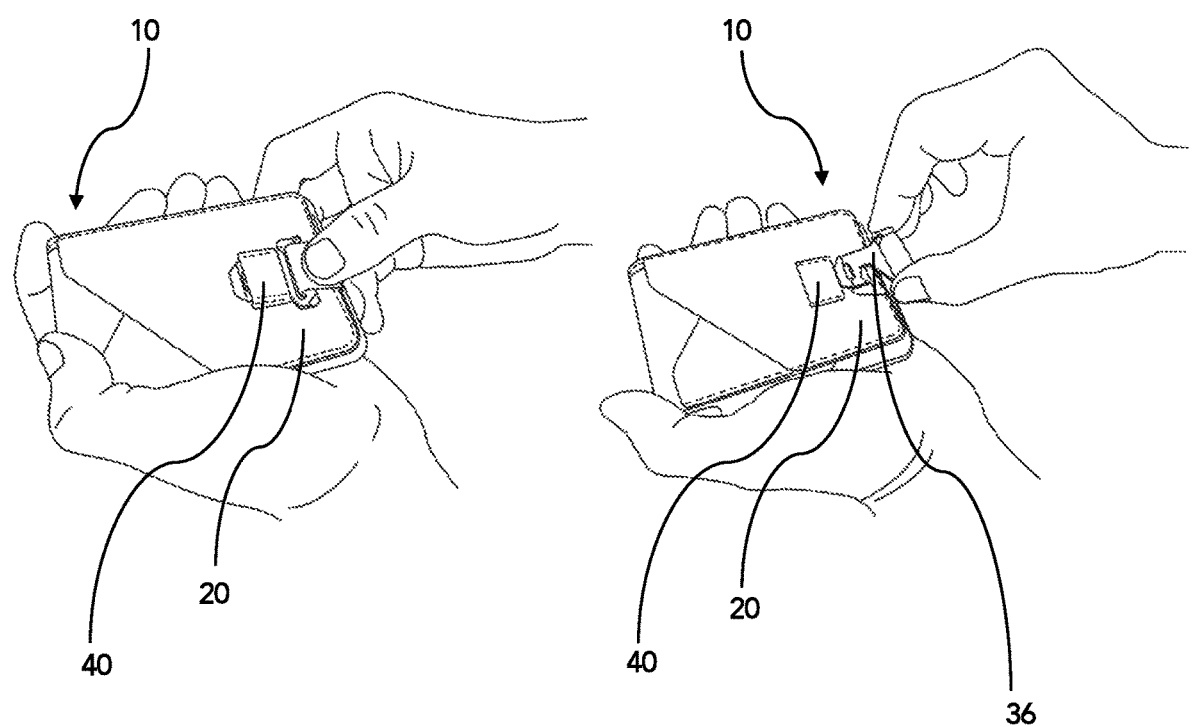
FIG. 31 illustrates the operation of the second accessory.
Figure 32:
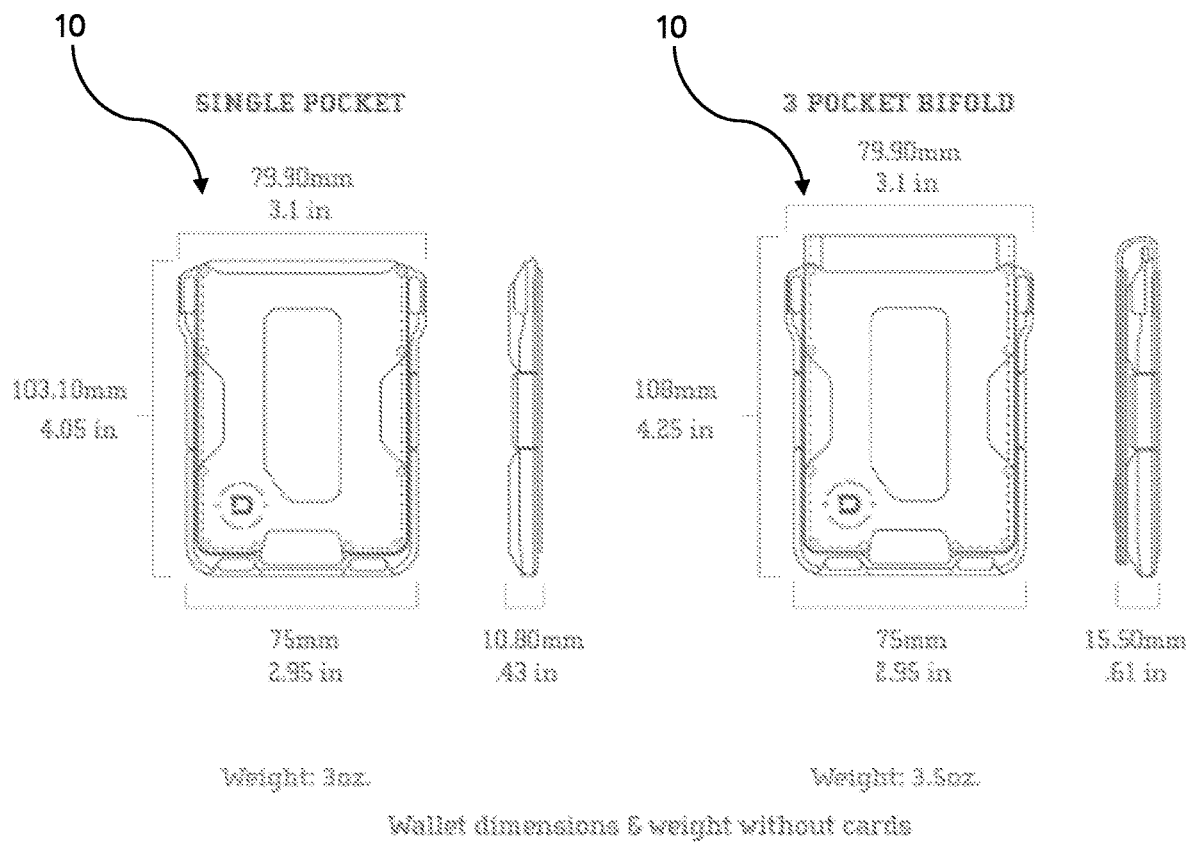
FIG. 32 shows exemplary dimensions and weights for two wallet embodiments.
Figure 33:
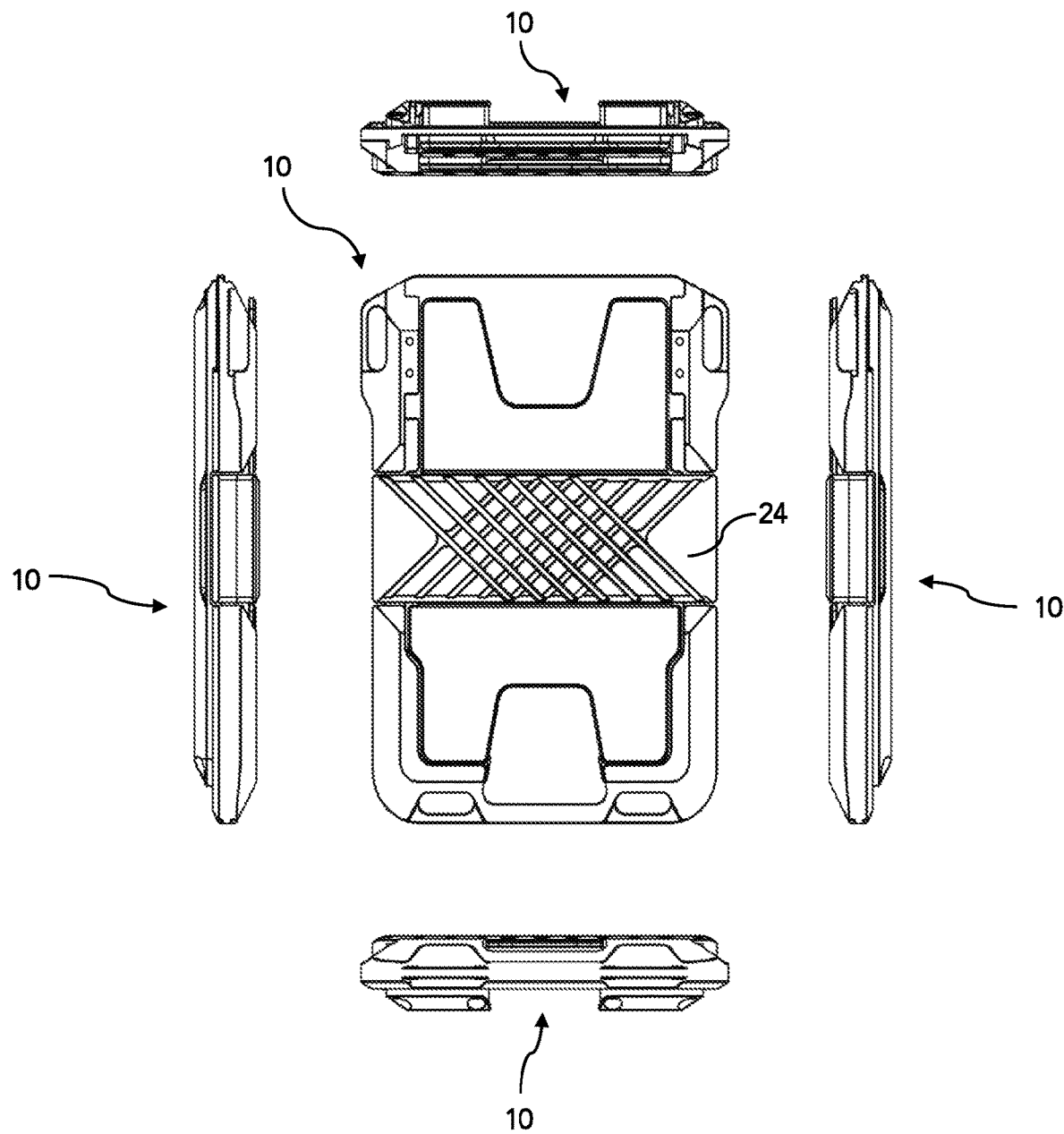
FIGS. 33-39 show exemplary views of another embodiment named the Dango M1 Maverick Wallet.

FIG. 31 illustrates the operation of the second accessory. In one embodiment, the second accessory is attached to a nylon strap, indicated by reference character 38 in FIGS. 21-23 and 30, and is removable. A user can slide the second accessory in and out of a clasp pocket, indicated by reference character 40 in FIGS. 21 and 31, to open and close the bifold wallet. Once out of the clasp, the second accessory can be used as a small chisel, a hex wrench (such as a ¼" hex wrench), a bottle opener, a flat head or a Phillips head screw driver.

Inspired by military, first responders, and hardcore preppers, the M1 Maverick Spec-Ops edition is a utility vertical wallet with a robust yet sleek design that is built for the rugged and tactical lifestyle. This wallet is the perfect companion for the everyday survivalist. The M1 Spec-Ops combines CNC Machined aluminum with a DTEX material; a fine mixture of an industrial "bullet-proof" chassis with a wallet skin that is resilient, flexible and water resistant. The surface of the M1 chassis is ceramic coated with a firearms industry standard ceramic paint tough enough to withstand rough handling. The Single Pocket variant comes with its pairing Multi-Tool which has over 10 functions which are specifically designed to respond to life threatening and emergency situations. The functions of the multi-tool include: a seat belt cutter, serrated/sharpened edges, chisel, 2 paracord tensioners, an 02 oxygen wrench, nail pryer, standard ¼" inch hex wrench, and of course, a bottle opener. The MT04 Multi-Tool slides into the metal cavity where the cards sit and is nested securely onto the safety locks on the chassis.

FIGS. 33-38 show exemplary views of another embodiment named the Dango M1 Maverick Wallet. This embodiment has a center chassis that is used as a foundation for the wallet. The chassis, which can be made by various metals or composites, is CNC machined with bolt attachments so that the user can customize. The chassis or "skeleton" of the wallet allows customization of the wallet with different parts to it. Essentially the design makes the M1 wallet Modular. The manufacturer can use the same wallet chassis to release different versions of wallets with a common component. In the case of the M1 Maverick Rail Wallet, the front face of the wallet is made of two CNC machined metal parts called "rails", indicated by reference character 44 in FIG. 36, which are bolted on the M1 Maverick Wallet chassis by 6 bolts, but can be secured by other means such as glue, screw, among others. Other embodiments have leather pockets bolted onto this area.

When the "rails" are attached to the M1 Maverick Chassis, it turns the wallet into an ID wallet—or in other words, a card slot that keeps the card that you store exposed to easy RFID access, easy identification or easy access of some of the user's most used cards. The two "rails" have a machined cavity which becomes the "tracks" for the cards to slide in and out of the wallet.

When the "rails" are attached to the shell, it turns the wallet into an ID wallet—or in other words, a card slot that keeps the card that you store exposed to easy RFID access, easy identification or easy access of some of the user's most used cards. The two "rails" have a machined cavity which becomes the "tracks" for the cards to slide in and out of the wallet. What keeps the cards from falling out are three things: a barrier on the front face that prevents the cards from falling out of the wallet on a "Z" axis (such as that shown in FIG. 36), a restriction on the bottom of the rails to prevent the cards from sliding freely through the bottom; a barrier on bottom of the rails to prevent the cards from sliding through the bottom, and a flexing arm, indicated by reference character 42 in FIGS. 34, 37, 38, and 39, to create a spring like flex to allow cards to slide in/out, but not to fall out. The restriction can be a barrier on the bottom, but the restriction can also be a door, a latch, or a tension spring that will prevent the cards from falling through unsecured. In another embodiment, the tension arm can be placed both on the top and the bottom of the wallet. The flexing "arm" feature of each metal rail is placed at the top portion of the wallet that are machined to create a "springing" mechanism to flex just enough to allow cards to slide in and out in a restricted way. When cards are slid in and out, this restriction creates a "satisfying" clicking noise and feel and allows a smooth and secure grasp of the cards. Essentially, these flexing arms are like the gates for cards.

Figure 34:
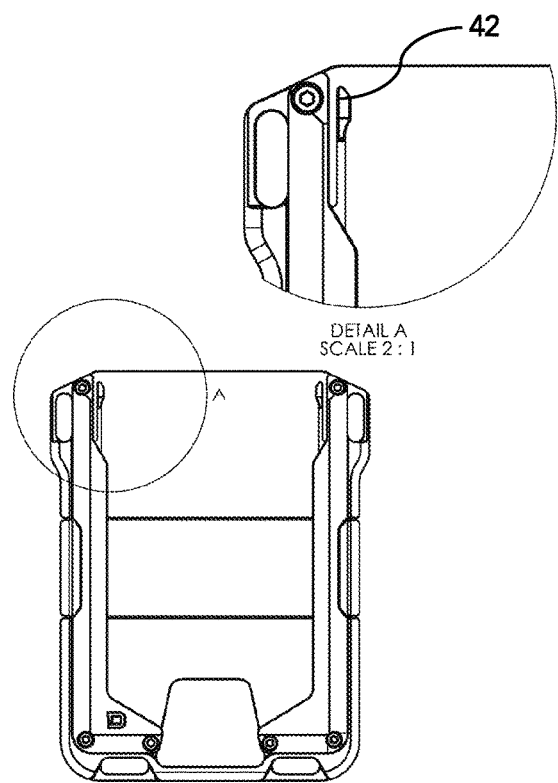
Figure 35:
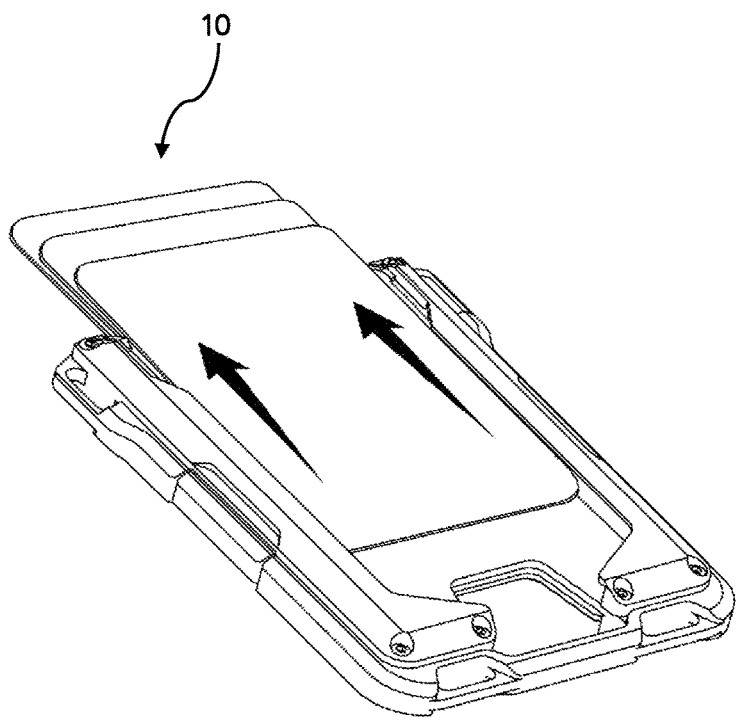
Figure 36:
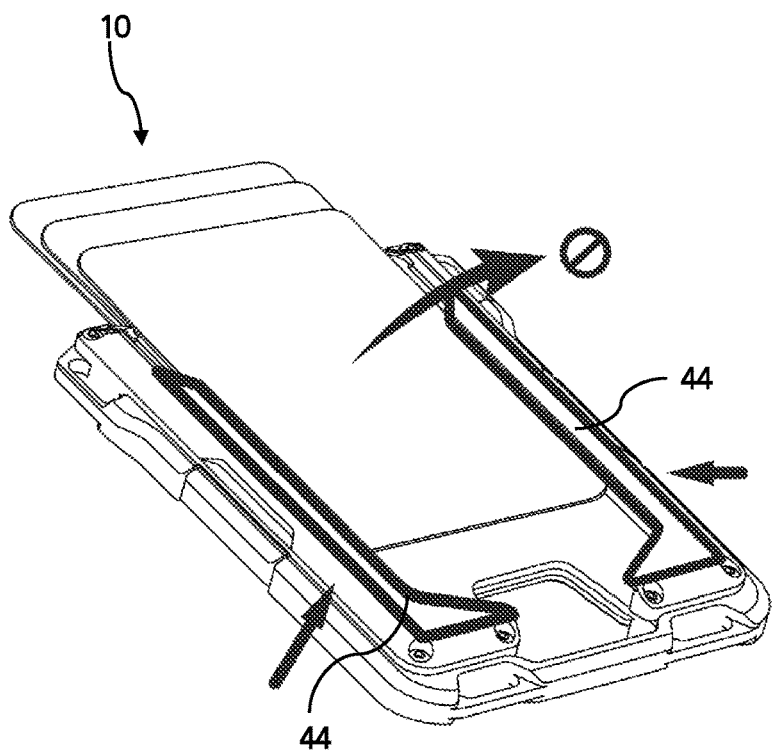
Figure 37:
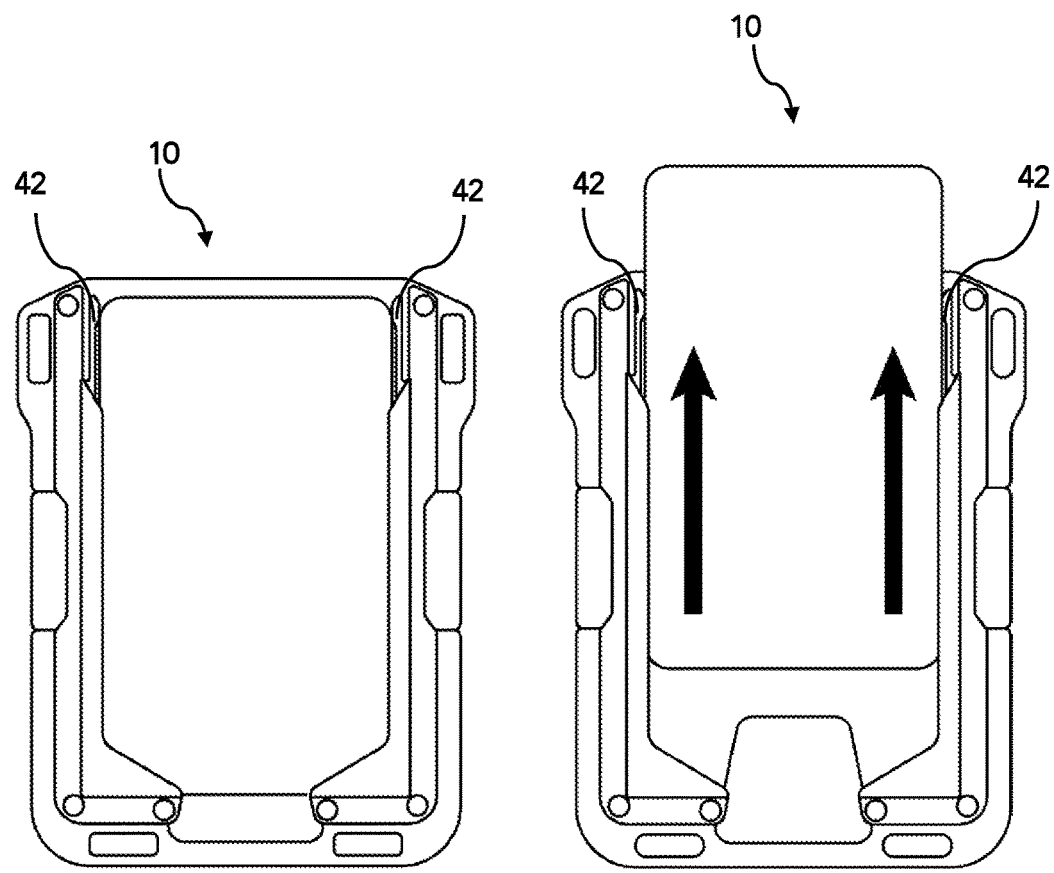
Figure 38:
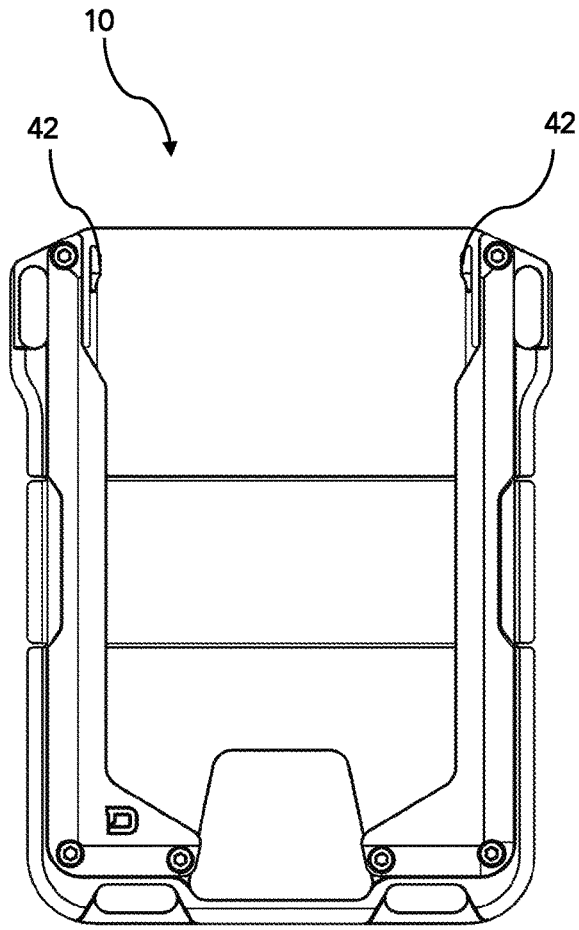
Figure 39:
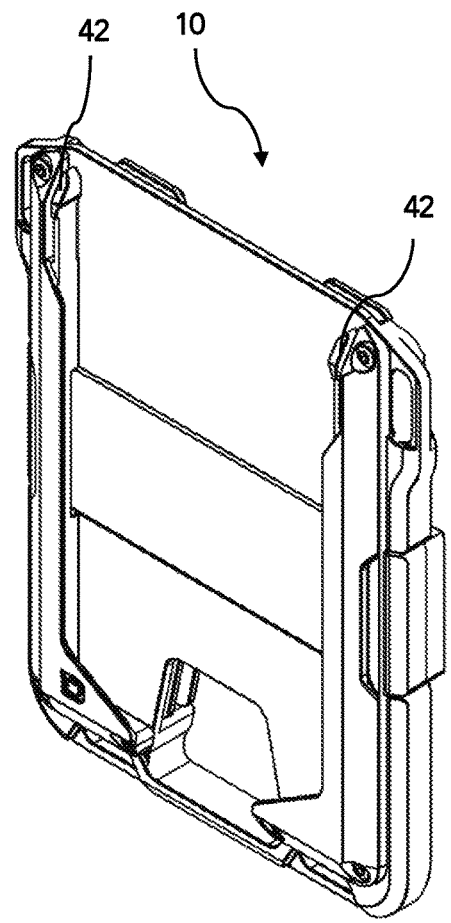

As best shown in detail A of FIG. 34, the flexing "arm" feature of each metal rail is placed at the top portion of the wallet that is machined to create a "springing" mechanism to flex just enough to allow cards to slide in and out in a restricted way. When cards are slid in and out, this restriction creates a "satisfying" clicking noise and feel and allows a smooth and secure grasp of the cards. Essentially, these flexing arms are like the gates for cards.

The rest of the body of the wallet is exactly like the traditional M1 Maverick Wallet described above. In one embodiment, a silicone band is installed in a groove on the chassis to allow the rail wallets to be bolted onto the chassis without interruption. The silicone band holds a back-plate that protects and securely holds the cards in a cavity in the back side of the wallet and chassis. This back-plate can also be made by various metals or composites.

The wallet has a chassis, indicated by reference character 12 in FIGS. 1 and 9, that is made from CNC (Computer Numerical Control) machined metal (Aluminum/Stainless Steel/Titanium) to which a soft material, indicated by reference character 20 in FIGS. 8, 10, 21, and 31, can be attached with 10-11 stainless steel mil-spec bolts. CNC machining refers to a manufacturing process in which a block of metal is milled out to form a shape. On one side of the chassis, a metal pocket is milled out and enclosed by a separate CNC machined metal back plate. The metal chassis and backplate acts as an RFID blocking component (because of its metal properties) as well as a structural skeleton of the wallet while the attached soft material, usually textile or leather, serves as extra wallet pockets. Because the parts are modular, it allows the manufacturer to release several versions on the same foundation by plating or painting the metal chassis and changing the material, pattern or color of the pockets. The wallet can use a PU pocket called the DTEX material, which is a synthetic textured PU (Polyurethane) fabric made to feel like leather or cloth. The DTEX is stronger than leather and is an option if people want to waterproof their Dango wallet. The chassis is often plated by anodizing, ceramic coating, or processed in different manufacturing processes like tumbling or polishing to give the part a certain look and feel.

In addition to the assembly of the chassis and pockets, an injection molded silicone band surrounds the exterior of the wallet. Because of the silicone band's tensioning properties, it is used to hold or "sandwich" all components together including the separate metal backplate and the consumer's plastic or business cards. Moreover, the silicone band's properties allow the consumer to also hold extra cards or cash money. The band comes in several different colors, allowing the customer to personalize another component of the whole wallet. The texture of the wallet band is matte and plush to replicate a soft velvet feel. This texture is achieved by engraining it onto the injection molding tool before mass production. This texture is consistent on all of Dango Wallet bands and is often referred to as "soft-touch".

In various embodiments, the wallet may further comprise one or more spacers. The spacer may be configured to increase a thickness of the recess or cavity between the top shell and bottom shell. The spacer may comprise a block, shim, leaf, grommet, gasket, washer, or the like, for example, located between the top shell and the bottom shell and through which fastener may pass. In various embodiments, the spacer may be disposed between the top shell and the bottom shell at the shell hinge. However, the spacer may be disposed at any portion of the wallet suitable for increasing a thickness of the recess between the top shell and bottom shell. In various embodiments, several spacers may be optionally inserted between the top shell and bottom shell so as to customize the thickness of the wallet's interior recess and, therefore, its capacity to accommodate a varying number of cards, bills, and the like. In various embodiments, a kit may comprise a wallet as described herein and one or more spacers of different thicknesses.

While top shell and the bottom shell have been described herein as possessing particular, respective features, it will be understood by those skilled in the art that the top shell may comprise any feature described in association with the bottom shell, and the bottom shell may comprise any feature described in association with the top shell.

The disclosure has described certain preferred embodiments and modifications thereto. Further modifications and alterations may occur to others upon reading and understanding the specification. Therefore, it is intended that the disclosure not be limited to the particular embodiment(s) disclosed as contemplated for carrying out this disclosure, but that the disclosure will include all embodiments falling within the scope of the invention as detailed in the claims.

While the invention has been particularly shown and described with reference to a preferred embodiment, it will be understood by those skilled in the art that various changes in form and detail may be made therein without departing from the spirit and scope of the invention.

What is claimed is:

1. A wallet comprising:
 a first shell with one or more openings on a shell perimeter adapted to clip one or more objects to the one or more openings; and
 a second shell coupled to the first shell, the second shell including:
  a storage compartment; and
  a first rail and a second rail located on the second shell to slideably receive one or more cards in the storage compartment,
  wherein the first rail comprises a first flexing arm configured to move with respect to the second shell to slideably receive the one or more cards in the storage compartment, and
  wherein the second rail comprises a second flexing arm configured to move with respect to the second shell to slideably receive the one or more cards in the storage compartment,
 a first tool stored in the storage compartment; and
 a second tool attached to a nylon strap to slide in and out of a clasp pocket to open and close the wallet and the second tool provides one or more of: a small chisel, a hex wrench, a bottle opener, a flat head or a Phillips head screwdriver.

2. The wallet of claim 1, wherein the first rail and the second rail provide an opening for a radio frequency identification (RFID) access to at least one card.

3. The wallet of claim 1, wherein the first rail and the second rail comprise a machined cavity forming tracks for the one or more cards to slide in and out of the wallet.

4. The wallet of claim 1, comprising a barrier on a front face that prevents the cards from falling out on a Z axis.

5. The wallet of claim 1, comprising a barrier on a bottom side of the first rail and a bottom side of the second rail to prevent the one or more cards from sliding through the bottom.

6. The wallet of claim 1, wherein the first rail and the second rail provide a spring like flex to allow cards to slide in or out, and yet stay in the storage compartment until removed by hand.

7. The wallet of claim 1, comprising a machined portion positioned at a top portion of the wallet with a predetermined flex to allow one or more cards to slide in and out by hand action and otherwise to stay in the storage compartment.

8. The wallet of claim 1, wherein the first rail and the second rail generate a clicking noise.

9. The wallet of claim 1, wherein the first rail and the second rail generate a clicking feel when a card is inserted into the storage compartment.

10. The wallet of claim 1, wherein the first rail and the second rail generate a clicking noise when a card is inserted and grasp the card when the card is removed.

11. The wallet of claim 1, comprising an elastic band that wraps around at least one shell to secure a paper document thereto.

12. The wallet of claim 11, wherein the paper document comprises money.

13. The wallet of claim 1, wherein the first tool provides at least five functions.

14. The wallet of claim 1, wherein the first tool comprises two or more of: a seat belt cutter, serrated/sharpened edges, a chisel, two paracord tensioners, oxygen wrench, a nail pryer, a hex wrench, and a bottle opener.

15. The wallet of claim 1, wherein the first tool slides into the storage compartment and is nested securely within the storage compartment with two safety locks.

16. The wallet of claim 1, wherein the openings are used to attach keys, lanyards or tethers.

* * * * *